(12) United States Patent
Harvey et al.

(10) Patent No.: US 12,351,044 B2
(45) Date of Patent: **\*Jul. 8, 2025**

(54) BATTERY SYSTEM AND RELATED MANAGEMENT SYSTEM

(71) Applicant: BRIGGS & STRATTON, LLC, Wauwatosa, WI (US)

(72) Inventors: Kyle Harvey, West Allis, WI (US); Todd Johnson, Wauwatosa, WI (US); Mark Noller, Milwaukee, WI (US); Jacob Schmalz, Milwaukee, WI (US); Nick Zeidler, Brookfield, WI (US)

(73) Assignee: Briggs & Stratton, LLC, Wauwatosa, WI (US)

( * ) Notice: Subject to any disclaimer, the term of this patent is extended or adjusted under 35 U.S.C. 154(b) by 588 days.

This patent is subject to a terminal disclaimer.

(21) Appl. No.: 17/631,206

(22) PCT Filed: Jul. 29, 2020

(86) PCT No.: PCT/US2020/043981
§ 371 (c)(1),
(2) Date: Jan. 28, 2022

(87) PCT Pub. No.: WO2021/021874
PCT Pub. Date: Feb. 4, 2021

(65) Prior Publication Data
US 2022/0314819 A1 Oct. 6, 2022

Related U.S. Application Data

(60) Provisional application No. 62/880,506, filed on Jul. 30, 2019.

(51) Int. Cl.
*B60L 50/60* (2019.01)
*H01M 50/509* (2021.01)
*H02J 7/00* (2006.01)

(52) U.S. Cl.
CPC ........... *B60L 50/66* (2019.02); *H01M 50/509* (2021.01); *H02J 7/00032* (2020.01)

(58) Field of Classification Search
CPC .......................... B60L 50/66; H02J 7/00032
(Continued)

(56) References Cited

U.S. PATENT DOCUMENTS 10,327,392 B2  6/2019  Conrad et al.
10,347,954 B2  7/2019  Rief et al.
(Continued)

FOREIGN PATENT DOCUMENTS

CN      211907879 U       10/2020
WO   WO-2018/191062 A1    10/2018
(Continued)

OTHER PUBLICATIONS

International Search Report and Written Opinion regarding Application No. PCT PCT/US2020/043981, mail date Dec. 18, 2020, 11 pps.

*Primary Examiner* — Jack Chiang
*Assistant Examiner* — Suchin Parihar
(74) *Attorney, Agent, or Firm* — Foley & Lardner LLP

(57) ABSTRACT

A battery system includes a battery assembly and an equipment interface. The battery assembly includes a battery pack, a battery housing enclosing the battery pack, a communication gateway, and a first electrical connector. The battery pack includes rechargeable battery cells. The communication gateway is configured to communicate using a first communication protocol and a second communication protocol different from the first communication protocol. The first electrical connector includes a plurality of first terminals. The equipment interface is configured to be coupled to a piece of equipment, and includes a second electrical connector including a plurality of second termi-
(Continued)

nals. The second electrical connector is configured to mate with the first electrical connector to electrically coupled the plurality of first terminals with the plurality of second terminals to electrically couple the battery assembly to the equipment interface.

17 Claims, 18 Drawing Sheets

(58) Field of Classification Search
USPC .......................................................... 320/109
See application file for complete search history.

(56) References Cited

U.S. PATENT DOCUMENTS

| | | | |
|---|---|---|---|
| 11,401,902 B2* | 8/2022 | Harvey | H04W 4/48 |
| 2014/0339922 A1* | 11/2014 | Glauning | H04B 3/02 |
| | | | 307/145 |
| 2015/0240773 A1* | 8/2015 | Koenen | F02N 11/12 |
| | | | 290/38 R |
| 2015/0295430 A1* | 10/2015 | Wright | H02J 7/00047 |
| | | | 307/43 |
| 2016/0046199 A1* | 2/2016 | Butler | H02J 7/0048 |
| | | | 320/106 |
| 2017/0008162 A1* | 1/2017 | Tsubota | H04L 12/12 |
| 2018/0202407 A1 | 7/2018 | Harvey et al. | |
| 2019/0075724 A1 | 3/2019 | Becke et al. | |
| 2020/0251917 A1* | 8/2020 | Ljung | H02J 50/80 |
| 2020/0285820 A1* | 9/2020 | Hu | G06F 13/4204 |
| 2021/0116511 A1* | 4/2021 | Tajima | B60L 50/64 |
| 2022/0221524 A1* | 7/2022 | K.V. | H02J 7/0013 |
| 2023/0187945 A1* | 6/2023 | Yang | H02J 7/0047 |
| | | | 702/63 |
| 2023/0216093 A1* | 7/2023 | Kim | H01M 10/48 |
| | | | 429/90 |

FOREIGN PATENT DOCUMENTS

| | | |
|---|---|---|
| WO | WO-2018/191390 A1 | 10/2018 |
| WO | WO-2019/028451 A1 | 2/2019 |

* cited by examiner

BATTERY SYSTEM AND RELATED MANAGEMENT SYSTEM

CROSS-REFERENCE TO RELATED APPLICATION

This Application is a National Stage Application of PCT/US2020/043981, filed Jul. 29 2020 which claims the benefit of U.S. Provisional Patent Application No. 62/880,506, filed Jul. 30, 2019, both of which are incorporated herein by reference in their entireties.

BACKGROUND

The present disclosure generally relates to the field of indoor and outdoor power equipment, and in particular, to the field of battery powered indoor and outdoor power equipment.

SUMMARY

One embodiment relates to a battery system. The battery system includes a battery assembly and an equipment interface. The battery assembly includes a battery pack, a battery housing enclosing the battery pack, a communication gateway, and a first electrical connector. The battery pack includes rechargeable battery cells. The communication gateway is configured to communicate using a first communication protocol and a second communication protocol different from the first communication protocol. The first electrical connector includes a plurality of first terminals. The equipment interface is configured to be coupled to a piece of equipment, and includes a second electrical connector including a plurality of second terminals. The second electrical connector is configured to mate with the first electrical connector to electrically couple the first terminals with the second terminals. The first communication protocol is used for communications between the battery assembly and the piece of equipment. The second communication protocol is used for communications between the battery assembly and an endpoint device.

Another embodiment relates to a battery system. The battery system includes a battery assembly and an equipment interface. The battery assembly includes a battery pack, a battery housing enclosing the battery pack, a first electrical connector, a near-field communication (NFC) tag reader, and a management circuit. The battery pack has a capacity of at least 300 Watt-hours. The first electrical connector includes a plurality of first terminals (e.g., power terminals, a data terminal with data pins) in communication with the battery pack. The management circuit is in communication with the NFC tag reader and is structured to adjust an electrical output parameter of the battery pack. The equipment interface is configured to be coupled to a piece of equipment, and includes a second electrical connector and an NFC tag. The second electrical connector includes a plurality of second terminals. The second electrical connector is configured to mate with the first electrical connector to electrically couple the plurality of first terminals with the plurality of second terminals to electrically couple the battery assembly to the equipment interface. The NFC tag reader is structured to read information from the NFC tag on the equipment interface and communication the information read from the NFC tag to the management circuit. The management circuit adjusts the electrical output parameter of the battery based upon the information read off of the NFC tag.

Another embodiment relates to a battery assembly. The battery assembly includes a battery housing, a battery pack, an electrical connector, a management circuit, and a communication gateway. The battery pack includes a plurality of rechargeable battery cells disposed within the battery housing. The electrical connector includes a plurality of terminals structured to selectively connect the battery assembly to an equipment interface mounted on a piece of power equipment. The plurality of terminals include power terminals and at least one data terminal separate from the power terminals. The management circuit is structured to monitor and control a battery status of the battery assembly. The management circuit is further configured to adjust at least one electrical output parameter of electricity supplied from the battery pack to the electrical connector. The communication gateway has at least one transceiver in communication with the management circuit. The communication gateway is configured to communicate over at least two different frequencies. The first frequency is between about 13 MHz and 14 MHz (e.g., NFC communication) and the second frequency is between about 2.3 GHz and 2.5 GHz (e.g., Bluetooth).

BRIEF DESCRIPTION OF THE DRAWINGS

The disclosure will become more fully understood from the following detailed description, taken in conjunction with the accompanying figures, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring to figures generally, the battery assembly described herein is a removable and replaceable battery assembly that can be used with various types of indoor and outdoor power equipment, as well as with portable jobsite equipment. Outdoor power equipment includes lawn mowers, riding tractors, snow throwers, pressure washers, tillers, log splitters, zero-turn radius mowers, walk-behind mowers, riding mowers, stand-on mowers, pavement surface preparation devices, industrial vehicles such as forklifts, utility vehicles, commercial turf equipment such as blowers, vacuums, debris loaders, overseeders, power rakes, aerators, sod cutters, brush mowers, portable generators, etc. Indoor power equipment includes floor sanders, floor buffers and polishers, vacuums, etc. Portable jobsite equipment includes portable light towers, mobile industrial heaters, and portable light stands. The power equipment 302 referred to throughout the specification can be considered to encompass any of the outdoor power equipment, indoor power equipment, and portable jobsite equipment described.

Figure 1:
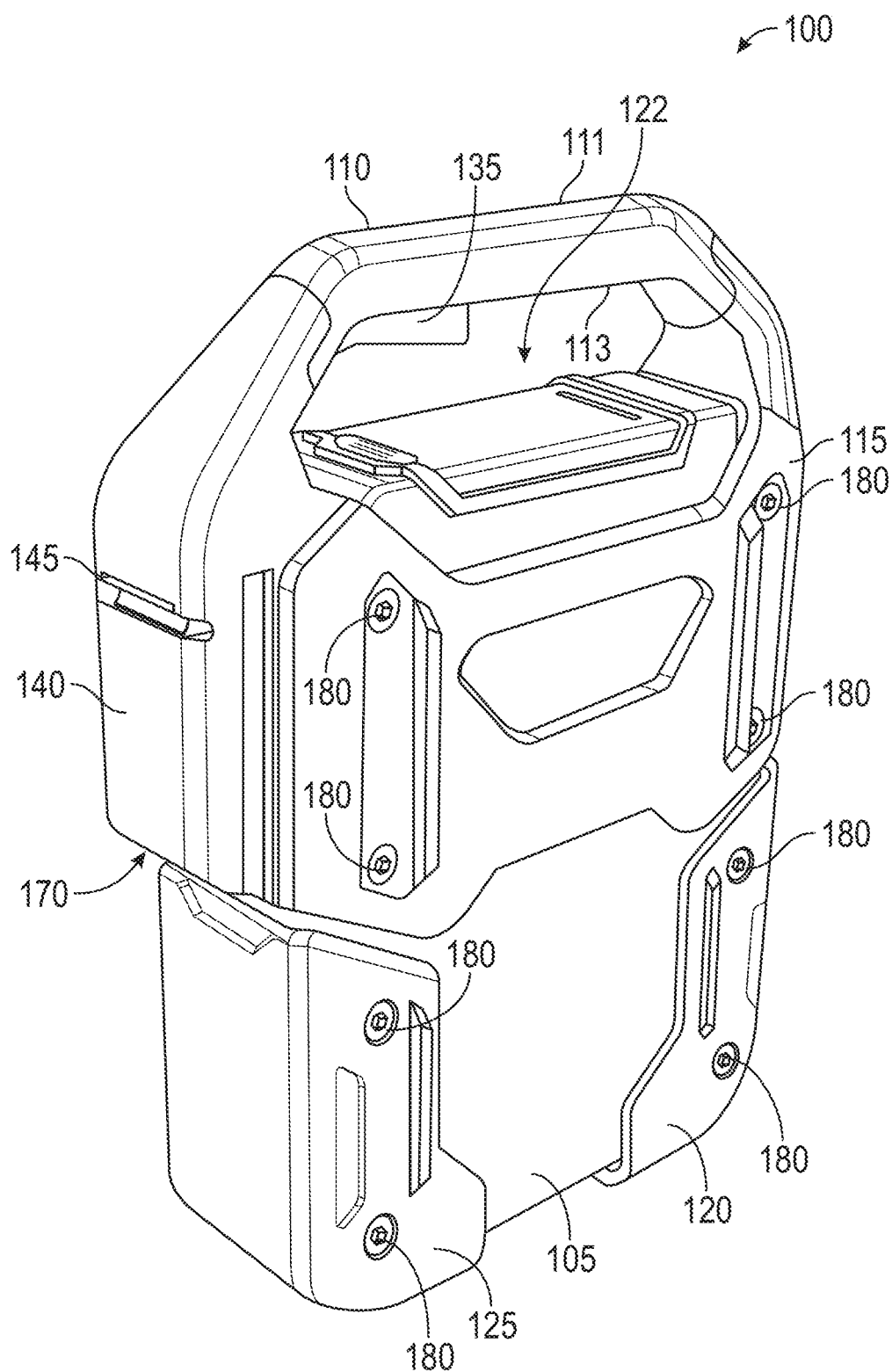
FIG. 1 is a perspective view of a battery assembly for use with various types of indoor and outdoor power equipment, according to an exemplary embodiment.

Referring to FIG. 1, the battery assembly 100 is shown, according to an exemplary embodiment. The battery assembly 100 is removable and rechargeable. The battery assembly 100 is configured to be coupled with an equipment interface (e.g., removably mounted on a piece of equipment) or inserted (e.g., dropped, lowered, placed) into a receiver integrated with a piece of equipment and/or a charging station. The battery assembly 100 can be installed into a piece of equipment vertically, horizontally, and at any angle. The battery assembly 100 includes a battery pack 105 and optionally, one or more modular portions as described below. The battery pack 105 is a Lithium-ion battery. However, other battery types are contemplated, such as nickel-cadmium (NiCD), lead-acid, nickel-metal hydride (NiMH), lithium polymer, etc. The battery assembly 100 yields a voltage of approximately 48 Volts (V) and 1400 Watt-hours (Wh) of capacity. It is contemplated that battery assemblies of other sizes may also be used. The battery assembly 100 is capable of approximately 2,000 charge/discharge cycles, approximately 5,000 W continuous power (13 Amps (A) per cell), 9,000 W peak power (25 A per cell), and 14,000 W instantaneous power (40 A per cell). The battery assembly 100 in total weighs less than approximately twenty-five pounds, allowing for ease of portability, removal, and replacement. The battery assembly 100 is also hot-swappable meaning that a drained battery assembly 100 can be exchanged for a new battery assembly 100 without completely powering down connected equipment. As such, downtime between battery assembly 100 exchanges is eliminated.

The battery assembly 100 can be removed by an operator from a piece of equipment (e.g., from an equipment interface 192 shown in FIG. 3, from a receiver of a piece of equipment) without the use of tools and recharged using a charging station, as described further herein. Accordingly, the operator may use a second rechargeable battery having a sufficient charge to power equipment while allowing the first battery to recharge. In addition, the battery assembly 100 can be used on various types of equipment including indoor, outdoor, and portable jobsite equipment. Due to its uniformity across equipment, the battery assembly 100 can also be used as part of a rental system, where rental companies who traditionally rent out pieces of equipment can also rent the battery assembly 100 to be used on such equipment. An operator can rent a battery assembly 100 to use on various types of equipment or vehicles the operator may own and/or rent and then return the battery assembly 100 to be used by other operators on an as-needed basis. Furthermore, multiple battery assemblies 100 may be used in conjunction with each other to provide sufficient power to equipment that may require more than a single battery assembly.

The battery assembly 100 is configured to be selectively and electrically coupled to a piece of equipment and/or a charging station. The piece of equipment or charging station includes a receiver having electrical terminals that are selectively and electrically coupled to the battery assembly 100 without the use of tools. For example, an operator may both insert (and electrically couple) and remove (and electrically decouple) the battery assembly 100 from a piece of equipment (e.g., from terminals of a receiver) without the use of tools. The equipment interface and/or receiver may include a planar mounting surface having at least one aperture for receiving a threaded fastener and the equipment interface and/or receiver may be coupled to the piece of equipment via a threaded fastener.

Figure 18:
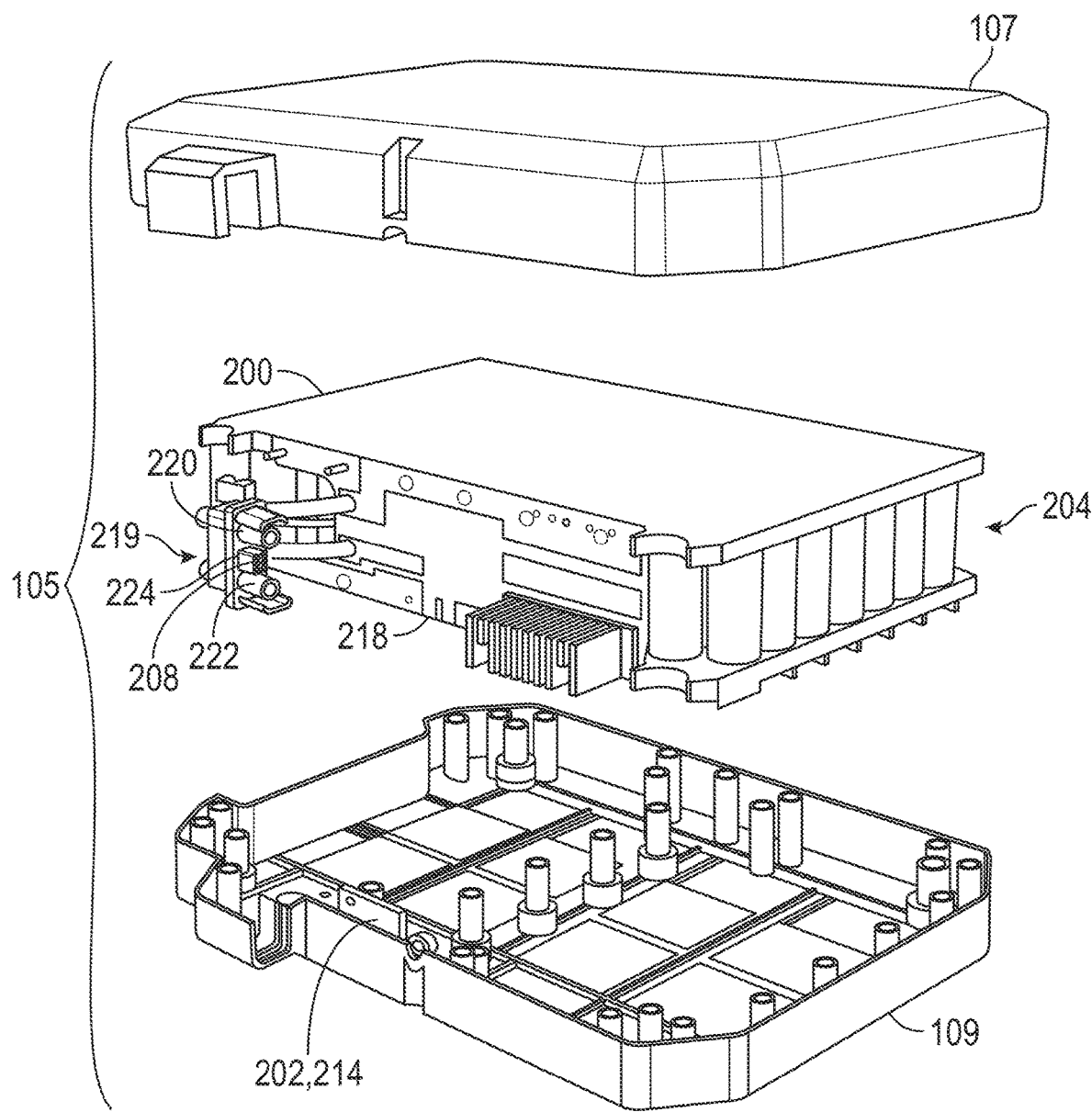
FIG. 18 is an exploded view of a battery pack within the battery system of FIG. 1.
Figure 20:
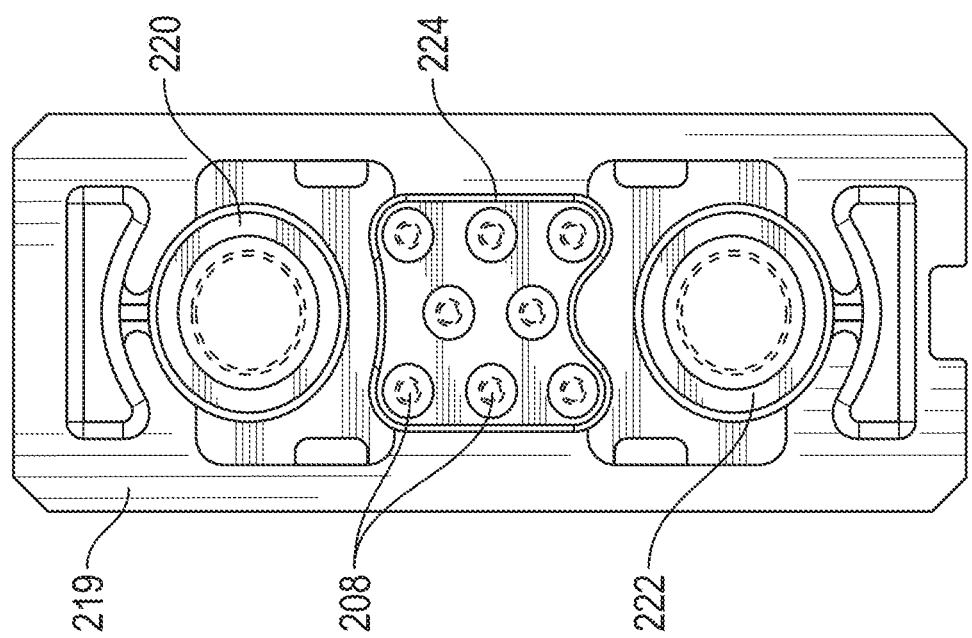
FIG. 20 is a top view of the male electrical connector of FIG. 19.
Figure 19:
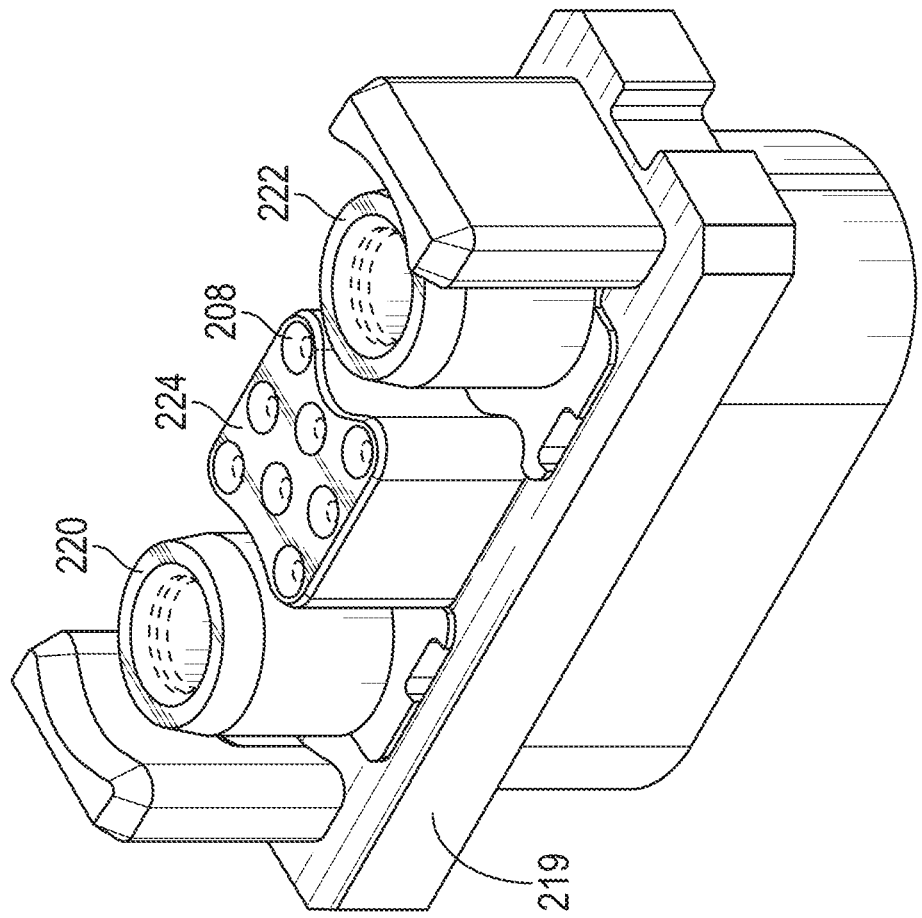
FIG. 19 is a perspective view of a male electrical connector of the battery assembly of FIG. 1.

With additional reference to FIG. 18, the battery pack 105 is shown in further detail. The battery pack 105 generally includes a battery housing formed of upper case 107 and lower case 109. The upper case 107 and lower case 109 are removably coupled to one another through the use of a plurality of dowel pins 111. In some examples, the plurality of dowel pins 111 extend upward from the lower case 109 and are received within a plurality of bosses (not shown) that define bores within the upper case 107. The upper case 107 and lower case 109 together define a cavity that receives battery cells 204. As explained above, the battery cells 204 can be lithium-ion cells that are electrically coupled to one another to provide electricity at various electricity ratings. The battery cells 204 can be arranged in various different ways (e.g., in a combination of parallel and series arrays) to produce different outputs.

Figure 17:
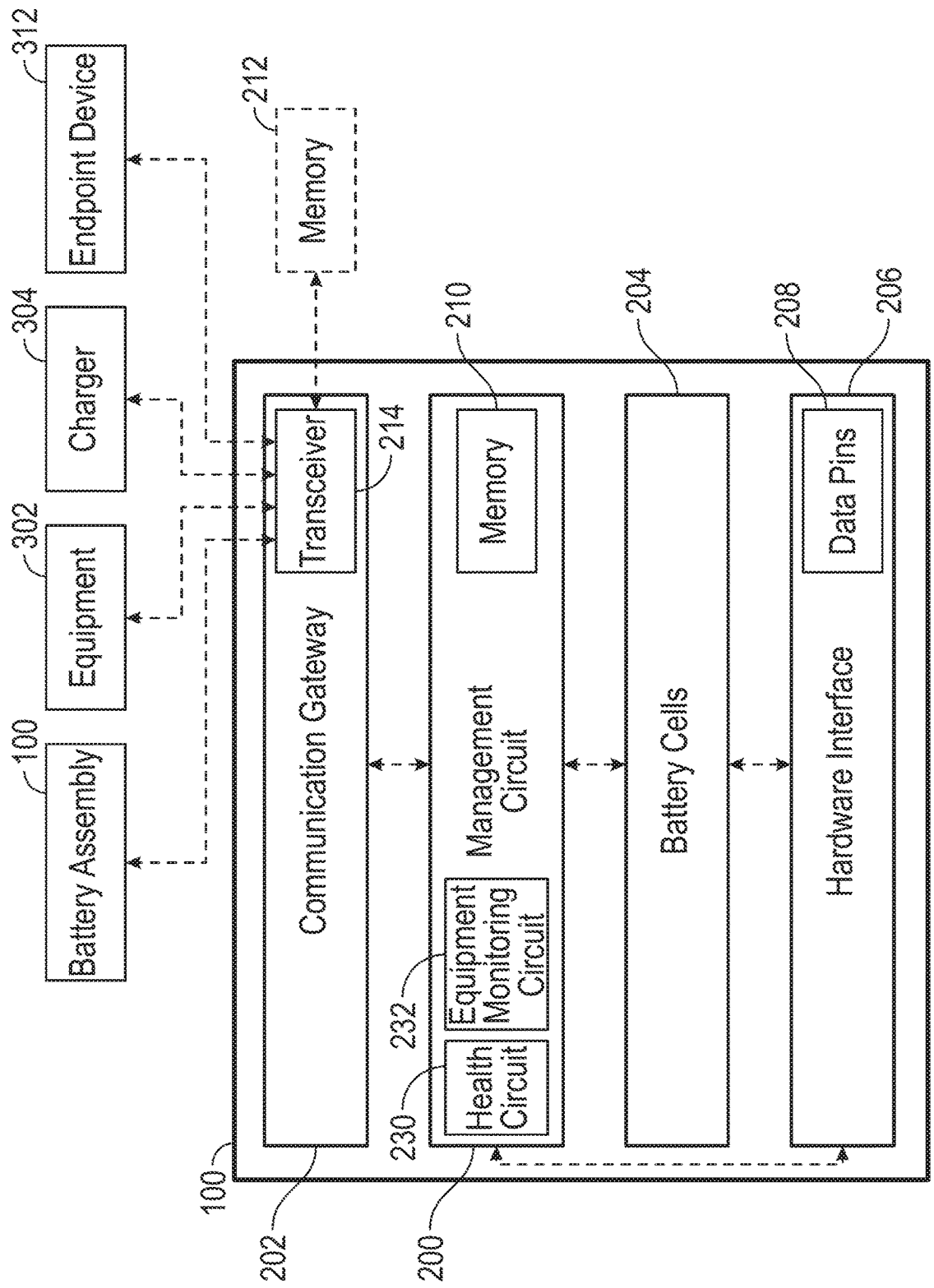
FIG. 17 is a schematic view of the battery system of FIG. 1.

The battery cells 204 provide power to components both internal to the battery pack 105 and external to the battery pack 105. For example, the battery cells 204 can be configured to provide power to different printed circuit boards (PCBs) positioned around the battery pack, including a transistor (e.g., a MOSFET) PCB 218 and a battery management PCB (which includes the management circuit 200, explained below). The battery cells 204 can also power a communication gateway 202 of the battery. As shown in FIG. 17, the communication gateway 202 includes one or more transceivers 214 that can send and receive signals from the battery assembly 100 to various external devices, including additional battery assemblies 100, power equipment 302, charger stations 304, endpoint devices 312 (e.g., laptops, cell phones, computers, tablets, etc.). In some examples, the electrical communication between the battery cells 204 and communication gateway 202 can be interrupted or otherwise disconnected for periods of time. For example, if the battery assembly 100 is not in use, the battery cells 204 may be decoupled from the communication gateway 202. As explained below, electrical communication (and power) from the battery cells 204 to the communication gateway 202 can be dependent upon the MOSFET detecting a connection between the battery assembly 100 and another device (e.g., power equipment 302).

Still referring to FIGS. 1 and 17-20, the battery pack 105 includes a connector 219 to electrically couple the battery pack 105 (and battery assembly 100) to external devices (e.g., different power equipment 302, chargers 304, etc.) The connector is 219 generally includes a positive terminal 220, a negative terminal 222, and a data terminal 224. The positive terminal 220 and negative terminal 222 each have a separate and dedicated electrical connection extending away from the connector 219 to the battery cells 204 within the battery pack 105. The positive terminal 220 and negative terminal 222 are configured to selectively supply electricity from the battery cells 204 to the external device that the battery assembly 100 is coupled with. As depicted in FIG. 18, each of the positive terminal 220, negative terminal 222, and data terminal 224 are arranged as male features that can be coupled and secured to dedicated female terminals on the external devices.

The data terminal 224 is positioned between the positive terminal 220 and negative terminal 222 and is configured to create a wired connection with corresponding data terminals on the external device. The data terminal 224 houses a series of data pins 208 that are configured to both receive and transmit data between the battery pack 105 and the external device coupled to the battery pack 105. The data pins 208 are configurable based upon the type of external device that is coupled to the battery pack 105. For example, the purpose or function of some or all of the data pins 208 may be different when the battery assembly 100 is coupled to a zero-turn radius lawnmower rather than a pressure washer. The data pins 208 can be configured to monitor various aspects of the external device, including runtime, health, battery usage, and other characteristics. The data pins 208 can also be configured to generate a user interface (e.g., on a user interface 122, discussed below) that can be used to control or monitor the external device separate from its dedicated control panel. Accordingly, the battery assembly 100 may provide a digital control panel or a digital dashboard for equipment that might not otherwise present any performance-based data. The number of data pins 208 present within the data terminal 224 can be varied based upon the degree of control and functionality needed. In some examples, the data terminal 224 houses eight data pins 208.

Figure 5:
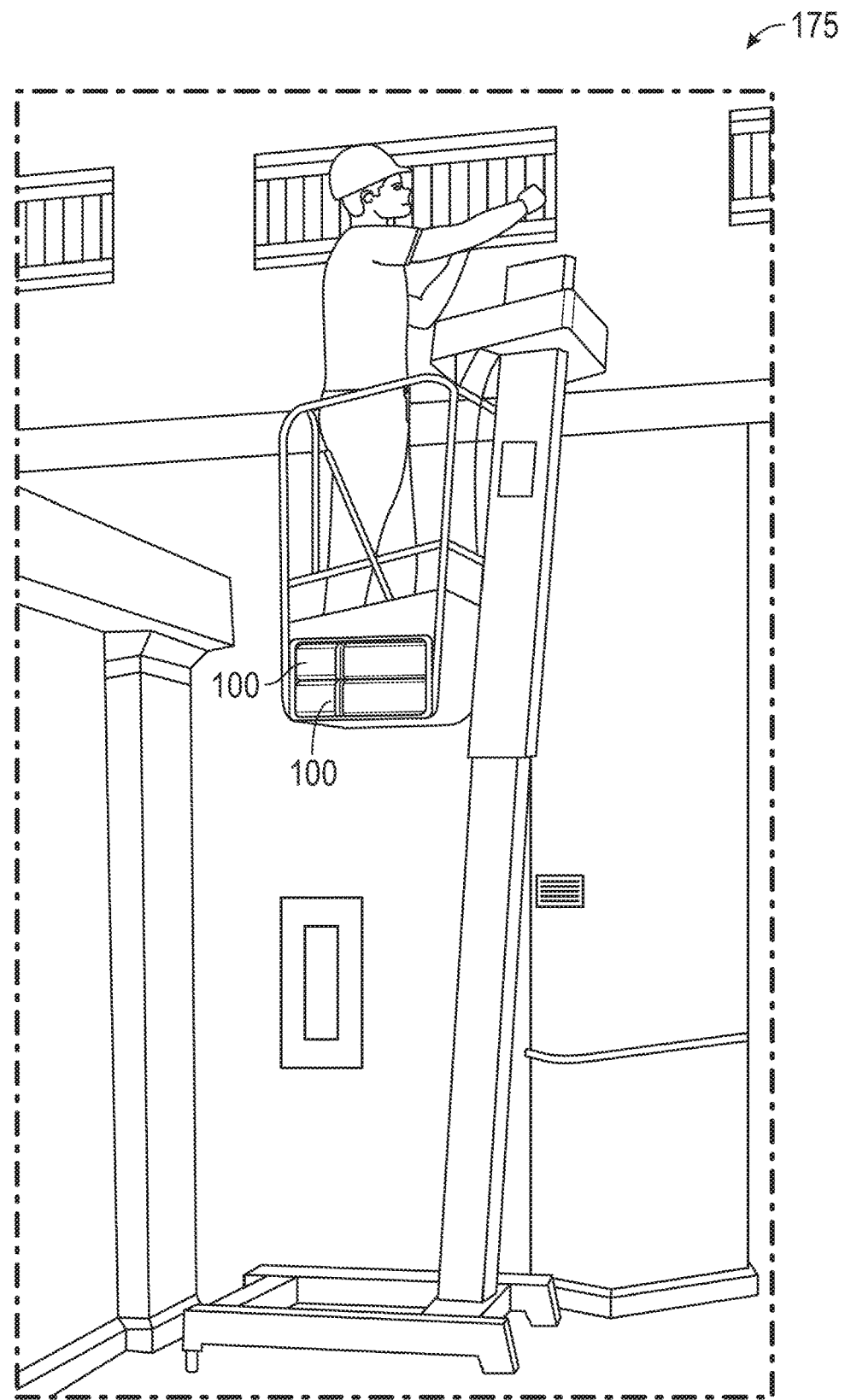
FIG. 5 is a perspective view of a multiple battery assembly used in a fixed mount environment.
Figure 6:
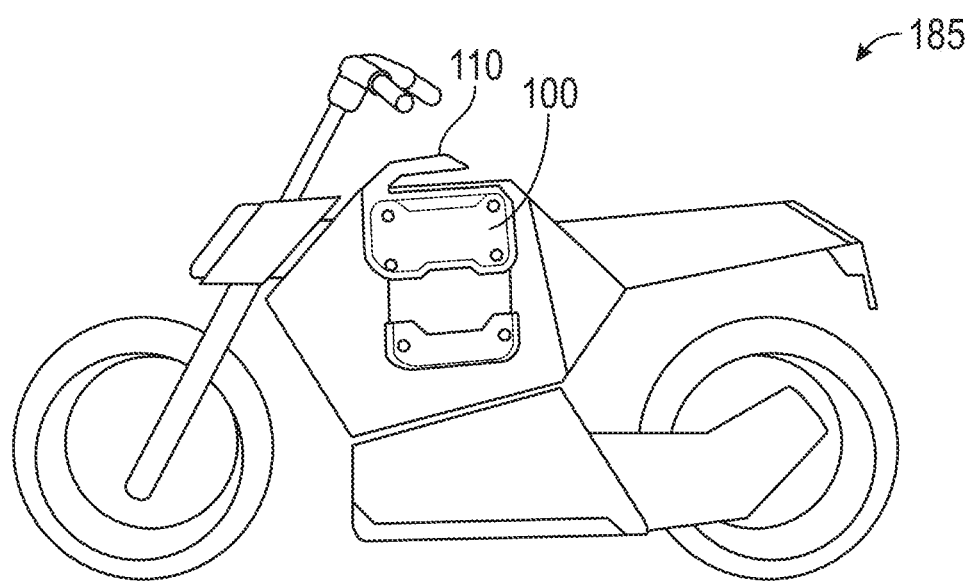
FIG. 6 is a side view of the battery system of FIG. 1 in use with a vehicle.
Figure 7:
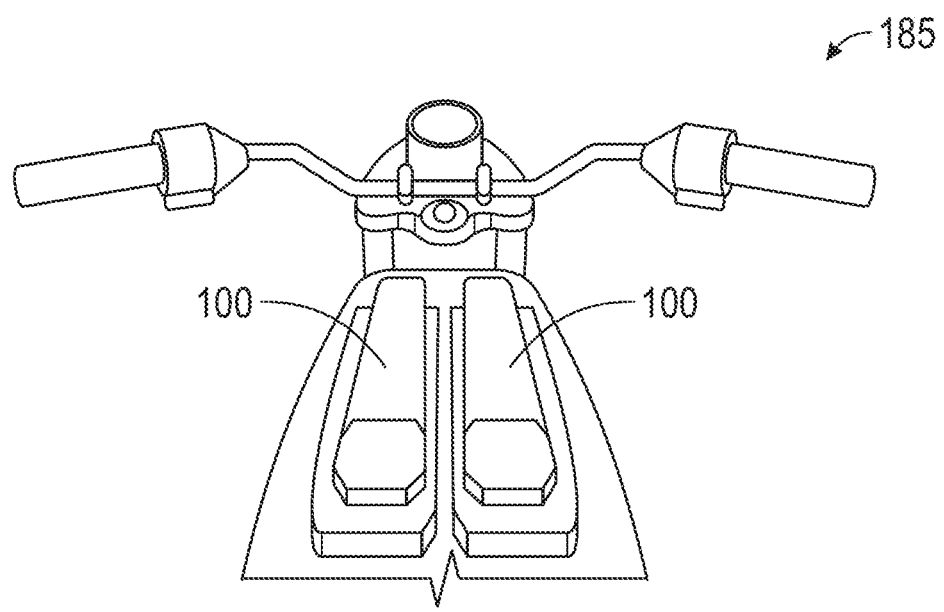
FIG. 7 is a front view of the battery system of FIG. 1 in use with a vehicle.

Still referring to FIG. 1, the battery assembly 100 further includes an upper modular portion 115 coupled to the upper portion of the battery pack 105, and lower modular portions 120, 125 coupled to a lower portion of the battery pack 105 on each of the left and right sides. The upper modular portion 115 and lower modular portions 120, 125 are coupled to the battery pack 105 using fasteners 180 (e.g., bolts, screws). The lower modular portions 120, 125 provide protection to the battery pack 105 and act to absorb or limit the amount of force the battery pack 105 endures by dropping, etc. The upper modular portion 115 and lower modular portions 120, 125 are exchangeable and customizable such that an operator or original equipment manufacturer may choose a different design and/or color based on the type or make and model of the equipment with which the battery assembly 100 is to be used. The upper modular portion 115 including the handle 110 and the lower modular portions 120, 125 can be removed from the battery pack 105. As such, in some embodiments, the battery assembly 100 may not include the upper modular portion 115 and/or lower modular portions 120, 125 and may be permanently mounted to a piece of equipment. Accordingly, as shown in FIG. 5, one or more battery assemblies 100 can be used in a fixed mount environment 175. In addition, as shown in FIG. 6, one or more battery assemblies 100 can be used in a removable and replaceable environment, such as with an electric vehicle 185. As shown in the example use case in FIG. 6, the battery assemblies 100 are inserted into slots in the vehicle 185 and can be removed by an operator by grasping the handle 110 of each battery assembly 100, unlocking the battery assembly 100 from the slot by moving the release mechanism on the handle 110 (e.g., movable member 135), and pulling upward and outward until fully removed from the slot.

The upper modular portion 115 includes a mating portion 140 including an opening 170 that houses the connector 219 and terminals 220, 222, 224. The terminals 220, 222, 224 are configured to mate with charging connectors on a charger (e.g., fast charger 250 in FIG. 9) and an equipment interface 192 shown in FIG. 3. The handle 110 includes an outer surface 111 and an inner surface 113 positioned nearer the battery pack 105 than the outer surface 111. The inner surface 113 includes a release mechanism or movable member 135 configured to be operable by the operator to unlock and decouple the battery assembly 100 from a charging station and/or a piece of equipment. When depressed, the movable member 135 moves inward toward the inner surface 113 and unlocks the battery assembly 100 out of engagement with a respective feature on a charging station and/or piece of equipment. In this way, when an operator grasps the handle 110, the operator can, at the same time and with the same hand, easily depress the movable member 135 to disengage the battery assembly 100 from a piece of equipment or charging station.

Figure 2:
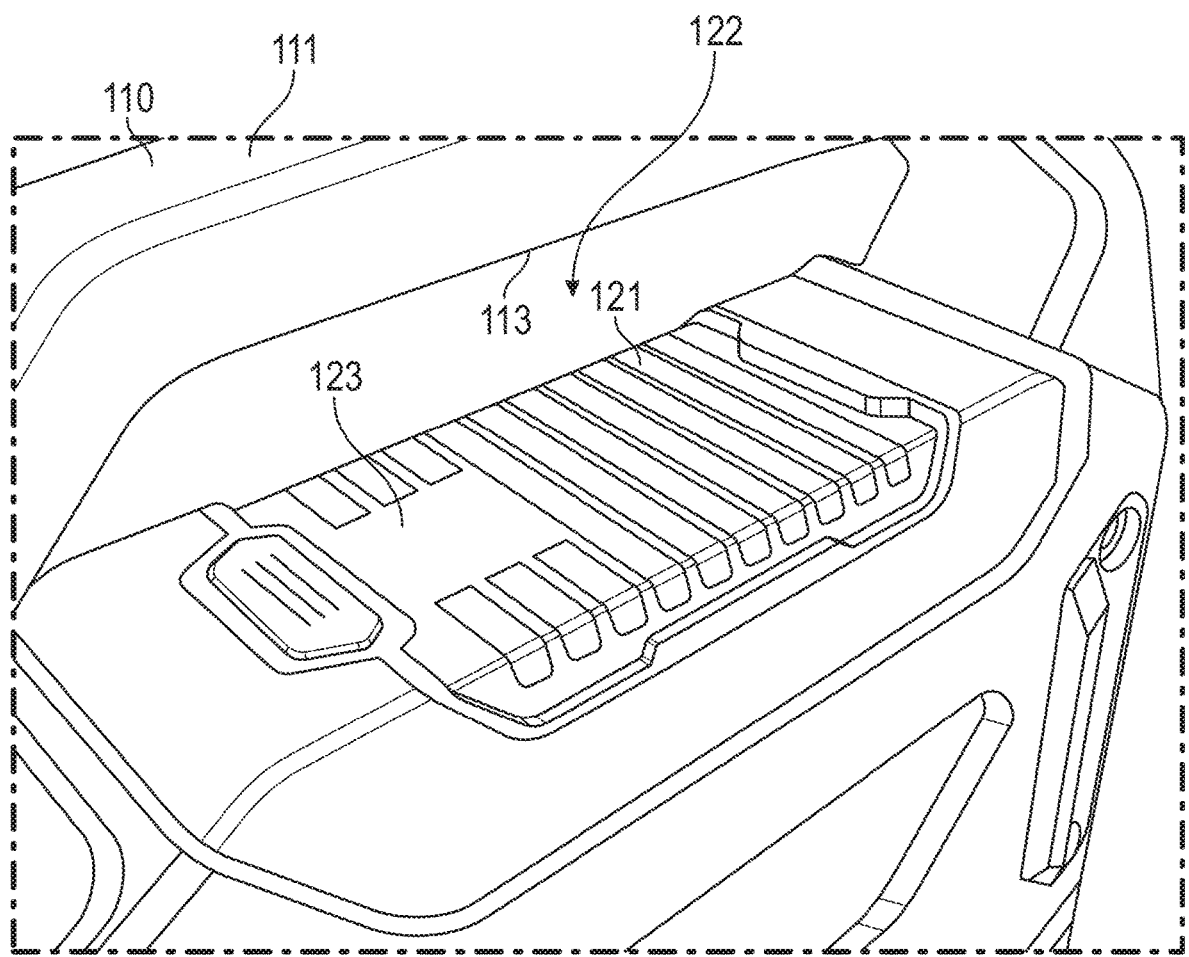
FIG. 2 is a perspective view of a portion of the battery assembly of FIG. 1.

Referring to FIG. 2, the battery pack 105 further includes a user interface 122 configured to display various status and fault indications of the battery assembly 100 and/or the associated equipment. The user interface 122 uses light-emitting diodes (LEDs) (on LED display 121), liquid crystal display (on LCD display 123), etc., to display various colors or other indications. The LED display 121 can provide battery charge status, and can blink or flash battery fault codes. The LCD display 123 can provide additional information about the battery assembly 100 including condition, tool specific data, usage data, faults, customization settings, etc. For example, battery indications may include, but are not limited to, charge status, faults, battery health, battery life, capacity, rental time, battery mode, unique battery identifier, link systems, etc. The user interface 122 can be a customized version of a user interface tailored to a specific tool, use, or operator. As explained above, the user interface 122 can be further customized to display real-time performance data related to the equipment coupled to the battery assembly 100, as received by the data pins 208.

Figure 3:
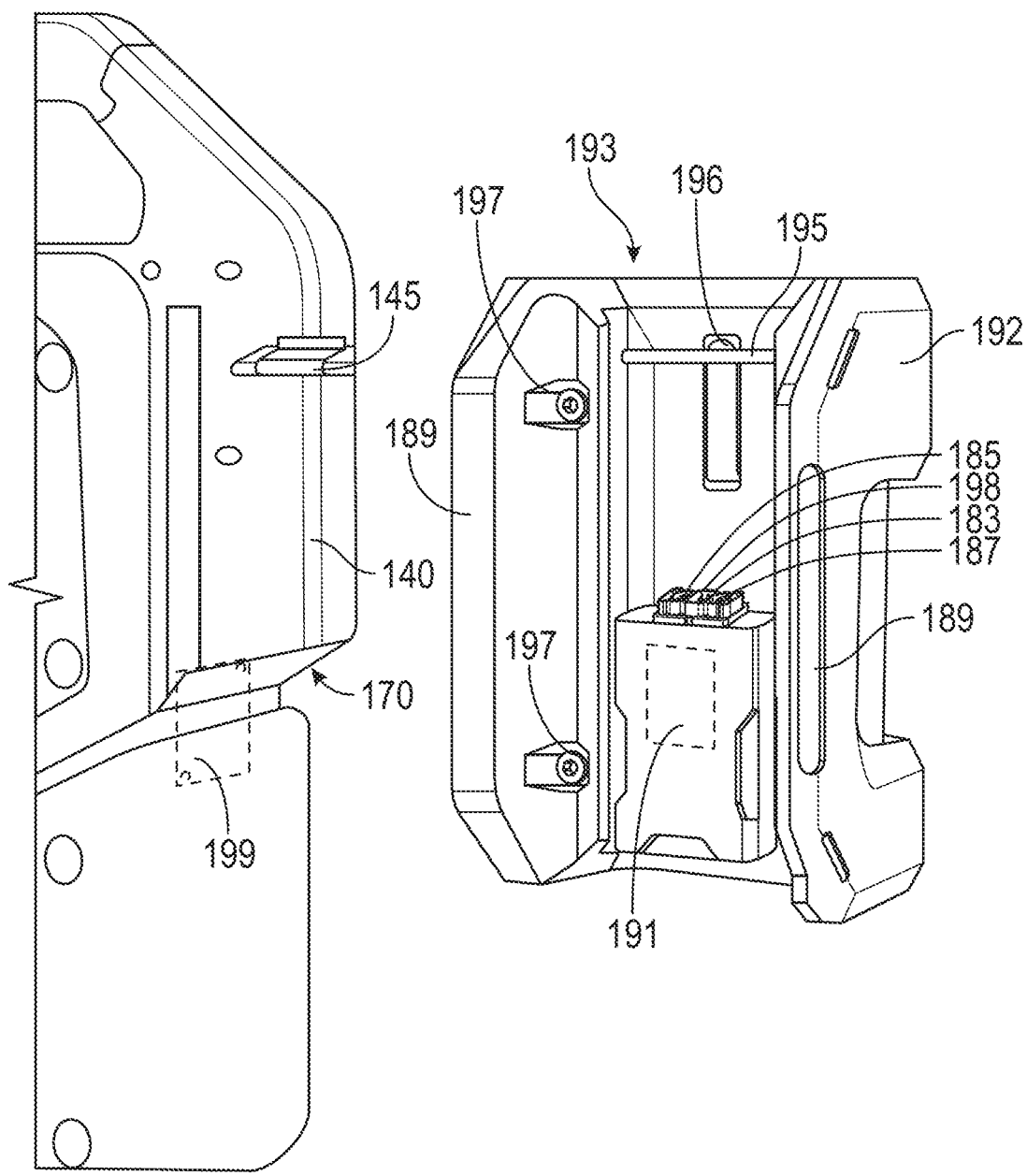
FIG. 3 is a perspective view of the battery system of FIG. 1 and an equipment interface.
Figure 22:
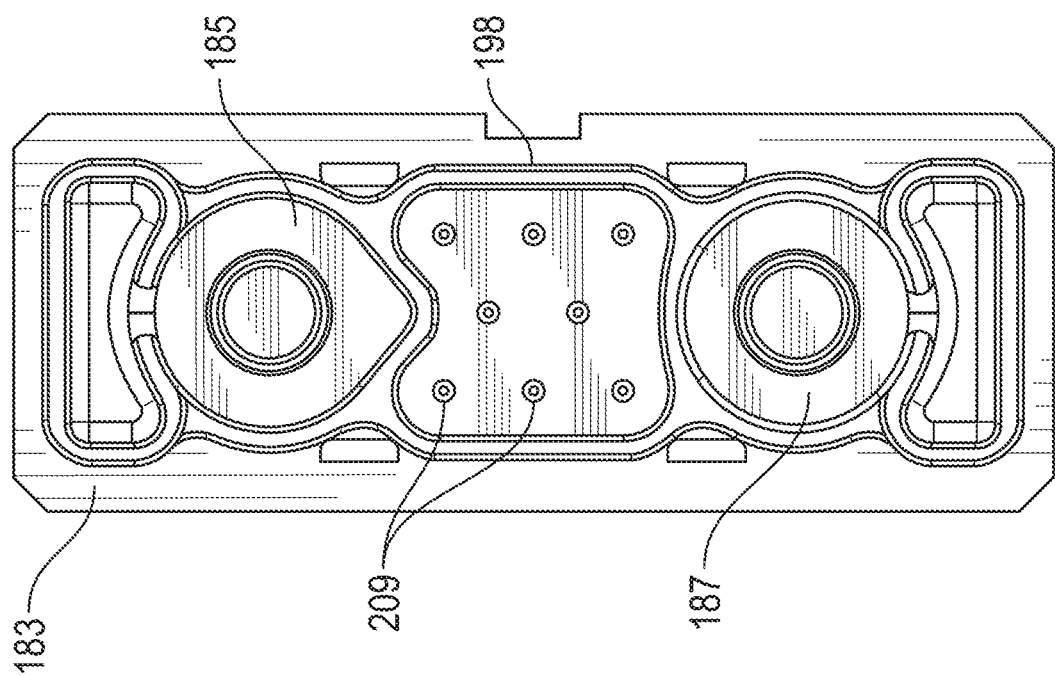
FIG. 22 is a top view of the female electrical connector of FIG. 21.
Figure 21:
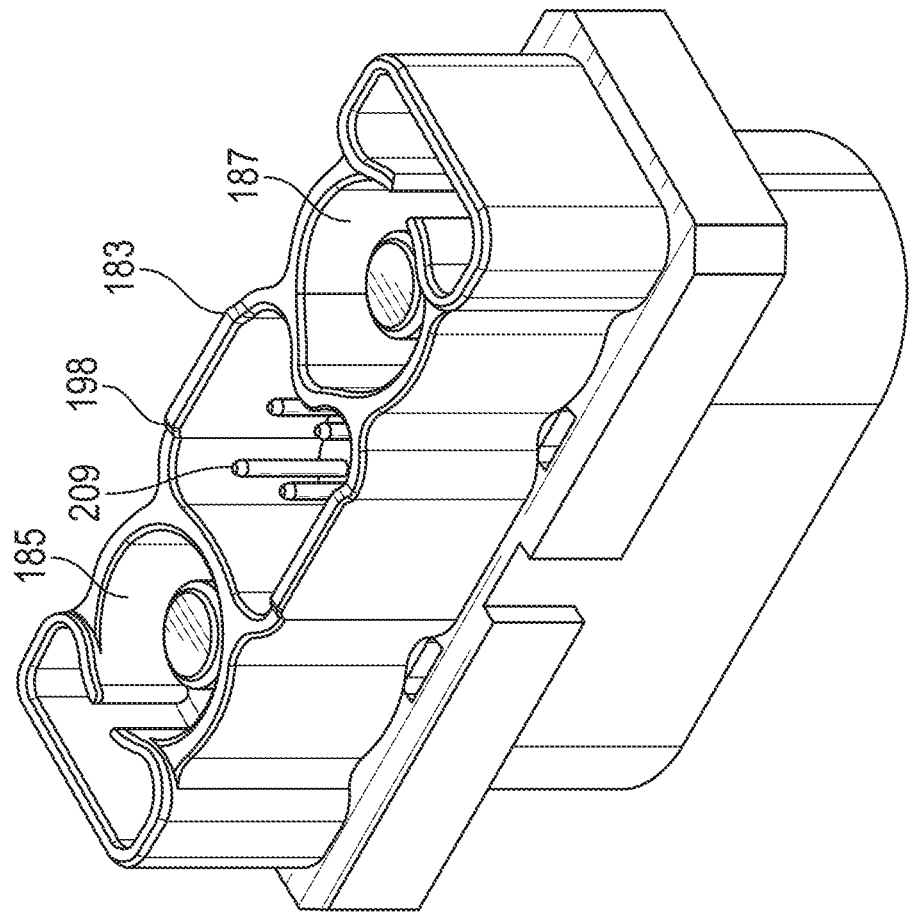
FIG. 21 is a perspective view of a female electrical connector of an equipment interface that can be coupled with the battery assembly of FIG. 1.

Referring to FIGS. 3 and 21-22, the battery assembly 100 is shown with an equipment interface 192. The equipment interface 192 is typically positioned on an external device that may be configured to receive electrical power from the battery assembly 100. The equipment interface 192 includes two vertical walls 189 with a receptacle 193 between. The battery assembly 100 is configured to slide into the receptacle 193 and lock into place on the equipment interface 192. The equipment interface 192 includes a second electrical connector 183 that includes three dedicated female terminals or connectors 185, 187, 198 configured to mate with the positive terminal 220, negative terminal 222, and data terminal 224 on the first connector 219. As depicted in FIGS. 21-22, the terminal 198 can house and support a plurality of data pins 209 to couple with and communicate with data pins 208. To install the battery assembly 100 onto the equipment interface, the terminals 220, 222, 224 are first aligned with the dedicated female terminals 185, 187, 198 on the equipment interface 192. Urging the terminals 220, 222, 224 toward the three dedicated female terminals 185, 187, 198 creates a removable coupling between the terminals 220, 222, 224 and female terminals 185, 187, 198 that also creates electrical communication between the battery assembly 100 and the external device supporting the equipment interface 192. In the installed position, the female connector 198 receives the data terminal 224, which creates a wired data connection between the data pins 208 and the data pins 209. Applying a threshold force in an opposite direction (e.g., pulling the terminals 220, 222, 224 away from the external device will cause the connector 219 to release the equipment interface 192 and decouple the battery assembly 100 from the external device supporting the equipment interface 192.

Figure 4:
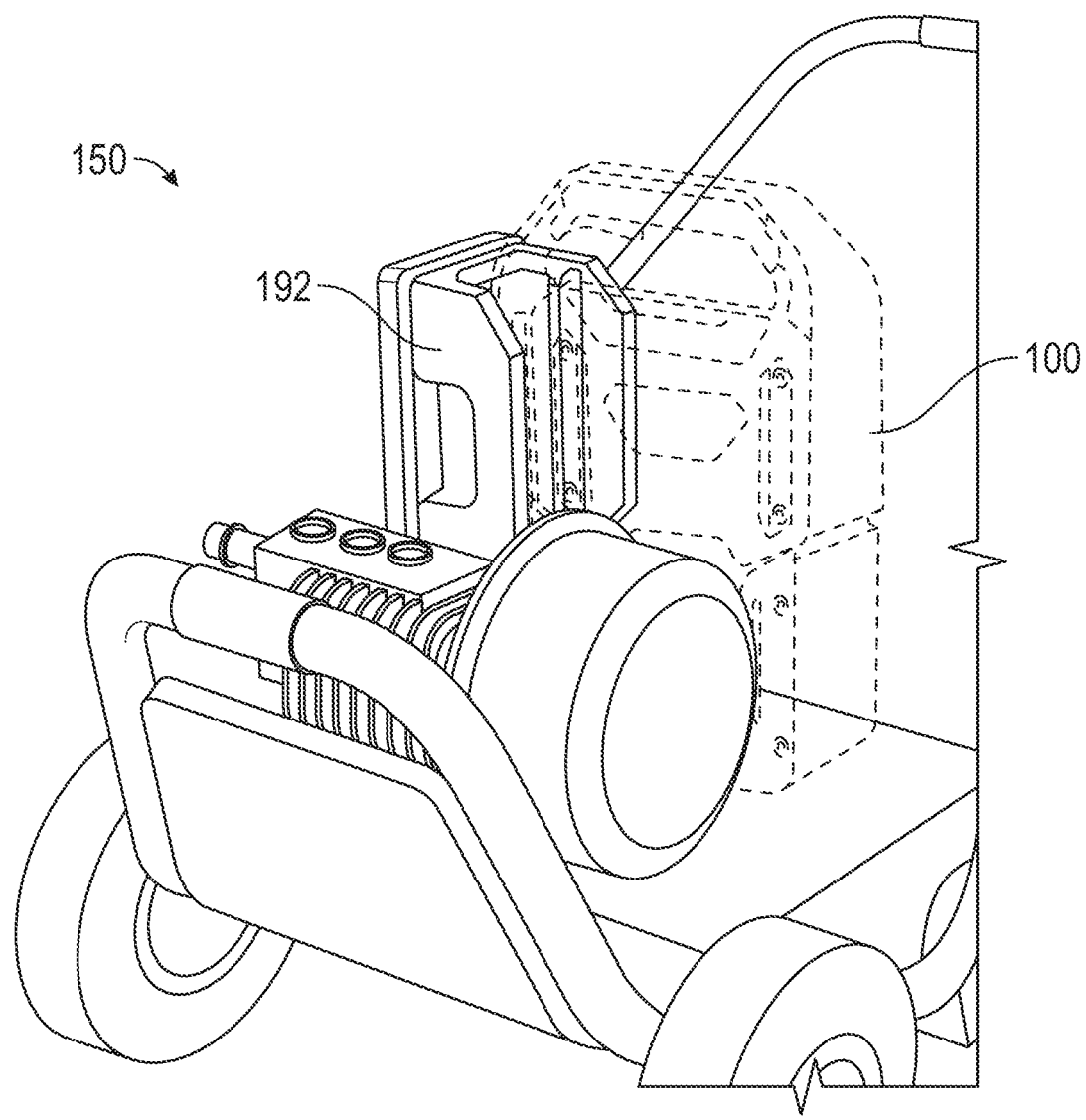
FIG. 4 is a perspective view of the battery system of FIG. 1 in use with a piece of equipment using the mounting assembly of FIG. 3.

The equipment interface 192 can also include mechanical components to create a more secure coupling between the battery assembly 100 and the equipment interface 192. In some examples, the equipment interface 192 also includes a horizontal member 195 and a movable member 196 that operate together to couple the equipment interface 192 to the mating portion 140 of the battery assembly 100. The battery assembly 100 is slid toward the equipment interface 192 until the terminals 220, 222, 224 connect with the female connectors 185, 187, 198 and the horizontal member 195 on the equipment interface 192 is coupled with the slot 145 on the battery assembly 100. The engagement of the slot 145 with the horizontal member 195 prevents and/or limits the vertical movement of the battery assembly 100 in or out of the equipment interface 192. The equipment interface 192 includes mounting hardware 197 (e.g., fasteners inserted through through-holes on the equipment interface 192) that enables the equipment interface 192 to be mounted to (e.g., coupled with, affixed to, attached to) a piece of equipment. As shown in FIG. 4, the equipment interface 192 is mounted to a piece of equipment 150 and the battery assembly 100 is removably inserted into the equipment interface 192 to interface with and provide power to the piece of equipment 150.

In some embodiments, the battery assembly 100 includes a Near-Field Communication (NFC) reader 199 (e.g., embedded into the battery pack 105) configured to communicate with an NFC tag 191 (e.g., electrical connector with an NFC sticker) on the equipment interface 192 to adjust the performance of the battery assembly 100. The NFC tag reader 199 can form a portion of the communication gateway 202 and can be considered a transceiver 214 as depicted in FIG. 17. The communication between the NFC tag 191 on the equipment interface 192 and the NFC reader 199 allows the battery assembly 100 (e.g., via a battery management system or management circuit 200, shown in FIG. 8) to determine what type of tool/power equipment with which the battery assembly 100 is being used. As such, the battery assembly 100 is configured to identify a tool or piece of equipment wirelessly through the NFC tag 191 on the equipment interface 192. The NFC reader 199 can communicate over frequencies between about 13 MHz and 14 MHz (e.g., about 13.56 MHz).

Once the battery assembly 100 is inserted into the equipment interface 192, the battery assembly 100 (e.g., through the battery management circuit 200) detects that a connection has been made with external equipment. In some examples, the battery assembly 100 includes a physical switch or a MOSFET (or other solid state relay) that is tripped when the battery assembly 100 is coupled with the equipment interface 192. Upon receiving an indication that a connection has been made, the battery assembly 100 activates the NFC tag reader 199 to scan for NFC tags 191 nearby. Once the NFC tag reader 199 identifies the presence of the NFC tag 191, the battery assembly 100 (e.g., NFC tag reader 199) reads the information from the NFC tag 191 and is able to associate the battery assembly 100 usage data with that specific tool or piece of equipment.

Based upon the type of equipment recognized by the NFC tag reader 199, the battery assembly 100 is able to reconfigure itself to provide electricity to the equipment at different ratings, take other actions, or provide particular functionalities based upon known or communicated equipment needs for the particular equipment the battery assembly 100 is connected to. For example, and with additional reference to FIGS. 17-18, if the NFC tag reader 199 (and/or management circuit 200) detects that the battery assembly 100 has been coupled to a zero-turn radius lawnmower, the management circuit 200 of the battery assembly 100 can access a local or remote memory 210, 212 including preferred power output characteristics for the zero-turn radius lawnmower. The battery assembly 100 then configures itself (e.g., using the management circuit 200) to output electrical power at or near the maximum rating (e.g., ~4500 W continuous power, 48 V) of the battery assembly 100 to accommodate this larger piece of outdoor power equipment. Alternatively, if the NFC tag reader 199 detects that the battery assembly 100 has been coupled to a walk-behind mower, for example, the battery assembly 100 and management circuit 200 will recognize the reduced equipment needs and configure the battery assembly 100 to output lower amounts of electrical power sufficient to power the walk-behind mower (e.g., ~1000 W continuous power, 48 V). Accordingly, the battery assembly 100 can control its own electrical power output parameters to optimize power equipment performance while also eliminating electrical losses that might otherwise occur. In some examples, the management circuit 200 is configured to adjust an output voltage (e.g., from 48 V to lower voltage) to accommodate different types of equipment as well. In still further examples, the NFC tag reader 199 can detect that the battery assembly 100 has been coupled to an unauthorized or damaged piece of equipment. The NFC tag reader 199 can communicate with the battery management circuit 200, which will prevent (e.g., block) or restrict electricity transmission between the battery assembly 100 and the piece of unauthorized or damaged equipment, regardless of whether an adequate electrical connection is formed between the connector 219 and the equipment interface 192. The reconfigurable nature of the battery assembly 100 extends the life of the battery assembly 100 between charges and prevents damage that may otherwise occur by using the battery assembly 100 on damaged, corrupted, or otherwise incompatible equipment. In some examples, the battery management circuit 200 can adjust one or more of output voltage, wattage, and amperage. In some examples, the battery management circuit 200 can adjust the output voltage between 12 V and 48 V. In still further examples, the battery management circuit 200 can adjust the output voltage between a range of 0 V and 48 V, and can accommodate various intermediate voltage outputs (e.g., 12 V, 18V, 24 V, 30V, 36 V, etc.).

The battery assembly 100 can also send and receive data through the hardwired connection formed between the data pins 208 and the equipment interface 192. Based upon the detected type of equipment (as determined by the NFC tag reader 199 or the management circuit 200), the management circuit 200 can reconfigure data pins 208 specifically to accommodate the tool the battery assembly 100 is coupled with. In some examples, the battery assembly 100 can access a local or remote memory 210, 212 to retrieve parameters related to the equipment 302 being powered. The data pins 208 on the battery assembly 100 can be configured to communicate with and query the equipment 302 being powered (see FIG. 12) to retrieve information related to the equipment 302, including equipment run-time, location, or health status, for example. After receiving data from the equipment 302, the battery assembly 100 can communicate operational parameters related to the battery assembly 100 (e.g., charge remaining, health) and the equipment 302 simultaneously, as explained in additional detail below. In some examples, the battery assembly 100 can deny electrical power to the equipment 302 receiving the battery assembly. For example, if the battery assembly 100 detects or otherwise receives a fault code from the equipment 302 (e.g., through the data pins 208), the battery assembly 100 may refuse to supply electrical power. The battery assembly can also remain "locked" (i.e., in an inactive, non-electrical power emitting state) if the NFC tag reader 199 and/or the data pins 208 detect an unexpected or prohibited equipment connection. In some examples, information received by the battery assembly 100 through the data pins 208 is used to configure one or more inputs (e.g., buttons) or the user interface 122 to present data or options specific to the equipment that the battery assembly 100 is coupled with. For example, if the battery assembly 100 is coupled to a floor buffer, one of the buttons near the user interface 122 (or the user interface 122 itself) may be configured into an ignition button. If the battery assembly 100 is coupled to a riding mower, for example, the battery assembly 100 may reconfigure one or more inputs or the user interface 122 to present data about one or both of the battery assembly 100 and the equipment 302 the battery assembly 100 is coupled with. For example, the battery assembly 100 may present each of the equipment runtime, equipment health, battery health, and battery life upon the user interface 122.

The battery assembly 100 can communicate with equipment and other mobile devices to provide further connectivity. For example, the NFC tag 191 could also be used to identify what slot the battery assembly 100 is plugged into if a tool has multiple battery slots. The battery assembly 100 can also be configured to read out fault codes with a mobile device. The mobile device can communicate via NFC to receive the fault codes. In this way, even if a cellular network is down, the battery assembly 100 can still communicate with a mobile device. In addition, a Controller Area Network (CAN) type of communication is not necessary in order to communicate with the battery assembly 100. In other embodiments, the battery assembly 100 could use radio-frequency identification (RFID) to identify a tool or piece of equipment.

Figure 8:
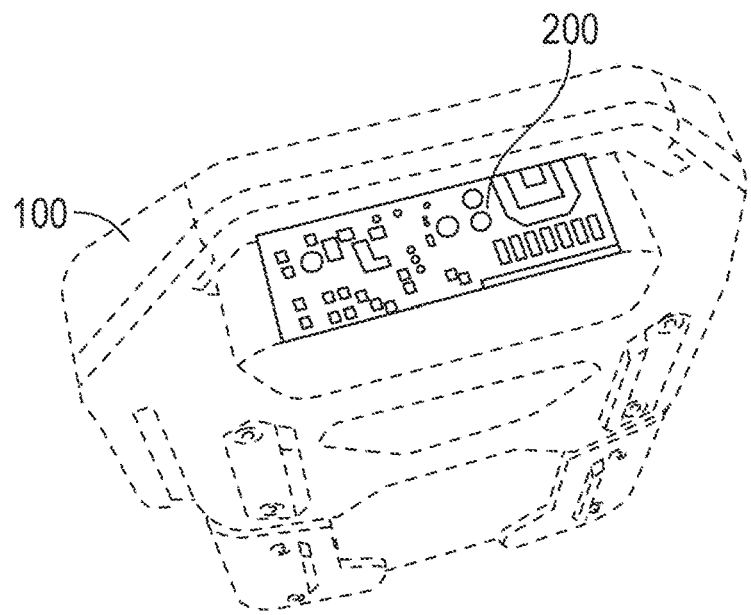
FIG. 8 is a perspective view of the battery system of FIG. 1.

Referring now to FIGS. 8 and 17, the battery assembly 100 includes management module or circuit 200, including diagnostic circuitry and a communications interface described further herein. The management circuit 200 is embedded within the battery pack 105. The management circuit 200 is configured to monitor battery status including current, voltage, temperature, etc. The management circuit 200 can also provide charge and discharge protection for the battery assembly 100. For example, the management circuit 200 may prevent rapid charging of the battery when rapid charging may impact the health of the battery assembly 100. For example, the management circuit 200 prevents rapid charging when the health of the battery assembly 100 or charge of the battery assembly 100 is below a certain threshold. The management circuit 200 is further configured to extend the life of the battery pack 105 and provide safety and reliability by monitoring and controlling various battery conditions. In some examples, the management circuit 200 can alternate the electrical power flow between the battery assembly 100 and the piece of equipment based upon the presence of an independent power source. The management circuit 200 can monitor (e.g., using information obtained from the equipment 302 through the data pins 208) the status of an independent power source being used to power the equipment 302. If the piece of equipment 302 is wired (e.g., plugged into) or otherwise receiving electrical power from an independent source (e.g., a wall socket providing 120 VAC at 60 Hz, a generator, etc.), the management circuit 200 can receive information that a requested battery assembly 100 output is zero. The management circuit 200 can configure the battery assembly 100 so that excess power from the independent source is routed through the equipment 302 and used to charge the battery assembly 100. The management circuit 200 can continuously monitor the status of the independent source and/or equipment, such that if a disruption in power to the equipment occurs, the management circuit 200 can reconfigure the battery assembly 100 from a charging mode to an output mode, such that power is supplied from the battery assembly 100 to the equipment. Accordingly, the management circuit 200 prevents the equipment 302 from experiencing extended interruptions in electrical power.

Figure 9:
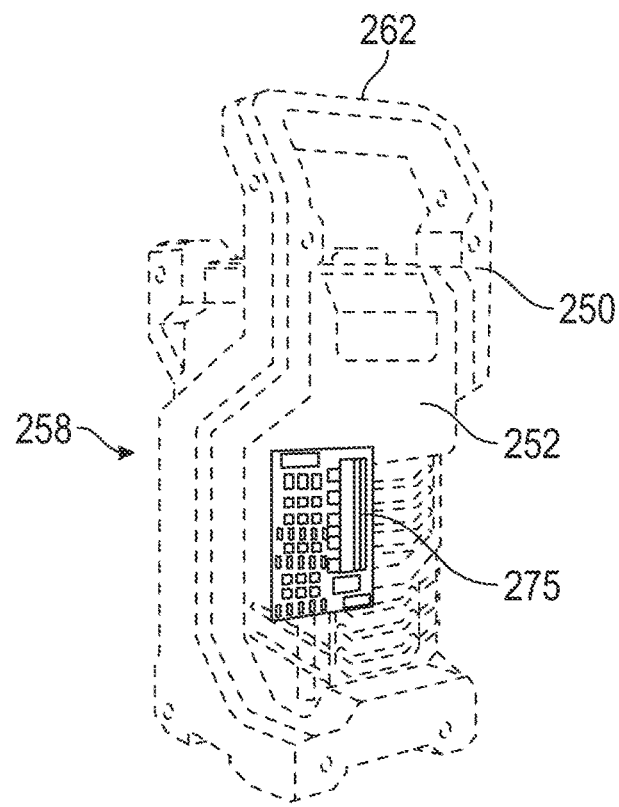
FIG. 9 is a perspective view of a fast charger for use with the battery assembly of FIG. 1.

Referring to FIG. 9, a fast charger 250 is shown, according to an exemplary embodiment. The fast charger 250 is configured to couple to the battery assembly 100 and charge the battery assembly 100. The fast charger 250 includes a charger body 252 and a receptacle 258. The fast charger 250 also includes a handle 262. The handle 262 can be grasped by an operator to maneuver the charger 250 (e.g., couple and decouple the charger 250 from the battery assembly 100). In some embodiments, the fast charger 250 includes an indicator light which may provide a status indication to an operator. The fast charger 250 is configured to slide or otherwise couple to the battery assembly 100 (e.g., at mating portion 140, with the connector 219) and electrically connect to the ports. The fast charger 250 is configured to be used without connections to a wall outlet. In some embodiments, the fast charger 250 is a 1000 W charger. The fast charger 250 is capable of operating in either a normal charging mode, where the charger is a 400 W charger or a fast or rapid charging mode, where the charger is a 1000 W charger. The fast charger 250 may charge the battery assembly 100 in approximately 1.5 hours in the rapid charge mode. An operator can select whether to use rapid charging mode (e.g., by pressing a rapid charge mode selection) or a lower rate or normal charging mode. A normal charging mode may be a default mode. The fast charger 250 also include charging management circuit 275 embedded within the charger body 252. The charging management circuit 275 is configured to manage (e.g., allow for) the use of rapid charging and normal charging modes as well as provide charging protections, such as preventing rapid charging when it may impact the health of the battery assembly 100. In some examples, the management circuit 200 communicates with the charging management circuit 275 upon detecting that the battery assembly 100 has been coupled to the fast charge 250. The management circuit 200 can configured the battery assembly 100 based upon the selected charging mode. In some examples, the management circuit 200 is configured to override a user selected charging mode (e.g., only a normal charging mode will be permitted) if a poor health status of the battery assembly 100 is detected.

As depicted in FIG. 17, the management circuit 200 may include one or more circuits 230, 232 configured to monitor the state of the battery assembly 100 or other aspects of the equipment with which the battery assembly 100 is used. A health circuit 230 may be further configured to monitor the state of the battery assembly 100 to predict the number of starts capable with the battery assembly 100. The number of starts capable with the battery assembly 100 may be calculated based on the characteristics of the equipment. For example, a battery assembly 100 having a specific charge may be able to perform more starts for one type of outdoor power equipment (e.g., a pressure washer) than for another type of outdoor power equipment (e.g., a lawn mower). For example, the health circuit 230 may monitor the state of charge of the battery, the average amount of power expended to start and run the equipment, and/or other characteristics of the equipment (e.g., run state, RPMs, etc.). The average amount of power expended to start the equipment and/or characteristics of the equipment may be communicated to the circuit through one or more of the terminals coupling the battery assembly 100 to the equipment interface 192. The number of starts capable with the battery assembly 100 may then be shown on a display integrated into the battery (e.g., user interface 122 shown in FIG. 2) or a display provided elsewhere, such as on a control panel of a piece of power equipment or a dashboard of a fleet management system or a mobile device interface.

An equipment monitoring circuit 232 may be further configured to monitor other characteristics of the equipment 302 by communicating with sensors and monitoring devices (e.g., fluid level sensors, temperature sensors, pressure sensors, chronometers, etc.). The equipment monitoring circuit 232 may output data related to the information received from the sensors and monitoring devices to a display, such as the user interface 122 (FIG. 2) integrated into the battery assembly 100 or a display shown on a user interface of a mobile device or dashboard. The data received and output by the equipment monitoring circuit 232 can be received from the equipment through a hardware interface 206 (e.g., through the wired connection between the data pins 208 and the equipment interface 192) or wirelessly through the one or more transceivers 214 communicating with the equipment 302 via the communication gateway 202. The display may therefore communicate to the operator of the equipment various operational data related to the equipment and the battery assembly 100. For example, the equipment monitoring circuit 232 may output to the display information such as battery operational time, equipment operational time, battery charge, time until empty, battery usage, or battery temperature. Additionally, the equipment monitoring circuit 232 may monitor the temperature of the battery assembly 100 via an input from a temperature sensor. Temperature monitoring can be used to alert the operator (e.g., via the user interface 122, user interface of the mobile device or dashboard) if the battery temperature is too low for normal use of the battery. Using the battery assembly 100 to power these circuits 230, 232 allows information to be provided to the operator (e.g., battery temperature, battery charge level) prior to the equipment being started so that any issues can be addressed before attempting to start the equipment (e.g., battery pack is too cold and needs to warm up).

Figure 12:
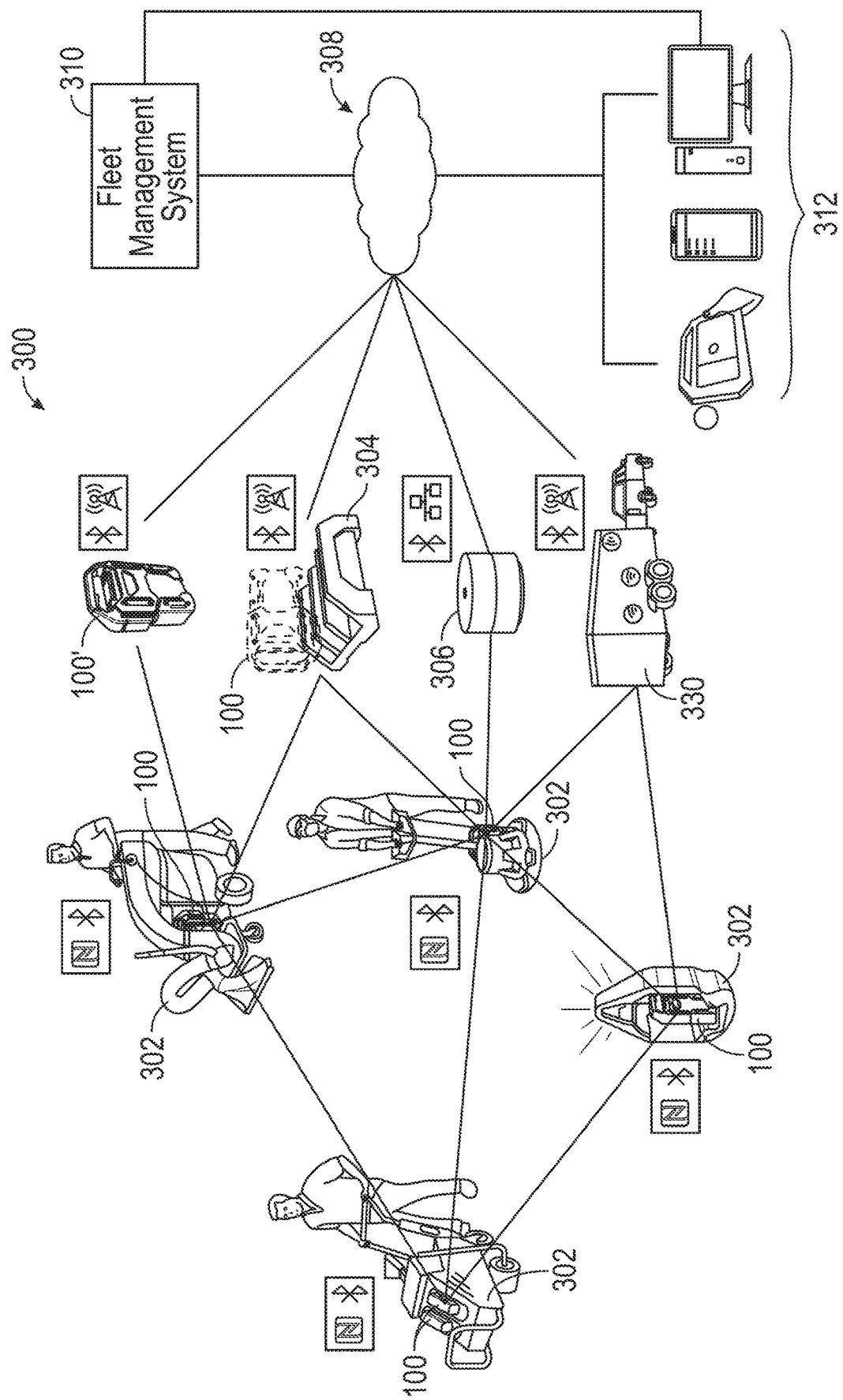
FIG. 12 is a schematic view of a battery management system using a mesh network, according to an exemplary embodiment.

In some embodiments, the communications interface of the management circuit 200 may be an interface to communicably connect the battery assembly 100 to an external device. For example, the communications interface may allow the battery assembly 100 to serially communicate with the external device via SPI (serial peripheral interface), I2C (inter-integrated circuit), USB (universal serial bus), etc., or any other serial communications protocol. In some embodiments, the external device which battery assembly 100 communicates with is a charging station (e.g., bay charger system 304 as shown in FIG. 12). The battery assembly 100 may communicate with the charging station information regarding a status of battery assembly 100 (e.g., currently charging, fully charged, ready to use, reserved, etc.), according to some embodiments.

In some embodiments, the battery assembly 100 includes a communication gateway 202. In some arrangements, the communication gateway 202 includes the hardware and logic necessary to communicate over multiple channels of data communication. For example, the communication gateway 202 may include a Wi-Fi interface, a cellular modem, a Bluetooth transceiver, a Bluetooth beacon, an RFID transceiver, an NFC transceiver, or a combination thereof. The communication gateway 202 facilitates data communication to and from the battery assembly 100 (and therefore the equipment 302 on which the battery assembly 100 is used). For example, the battery assembly 100 can include the NFC tag reader 199 to wirelessly communicate with NFC tags onboard power equipment, as well as a Bluetooth (or similar communication frequency, e.g., around 2.4 GHz) transceiver. The battery assembly 100 can then communicate wirelessly with multiple other devices, including power equipment, chargers, one or more battery assemblies 100, and/or cellular devices in a mesh network. The battery assembly 100 can then also communicate wirelessly with multiple other devices over different frequencies, enabling communication across multiple channels. In this way, the battery assembly 100 can communicate status and usage information as well as configuration data. As depicted in FIG. 17, the communication gateway 17 includes one or more transceivers 214 that can be configured to communicate with other battery assemblies 100, equipment 302, chargers 304, endpoint devices 312, a remote memory 212 (e.g., cloud-based memory, an external database or server), or different combinations of these devices. The communication gateway 202 can be further configured to send and receive information management circuit 200 to help control the battery assembly 100. Various other suitable communication protocols can be used by the battery assembly 100 as well. For example, the communication gateway 202 may include a transceiver 214 that is configured to communicate over one or more of 3G, 4G, and/or 5G networks (e.g., between about 450 MHz-86 GHz). In still other examples, the NFC tag reader 199 can be configured to communicate over different radio frequencies. For example, the NFC tag reader 199 can be configured to detect NFC tags or devices emitting signals at one or more of low frequency (e.g., between about 120 kHz to 140 kHz) and high frequency (e.g., about 13.56 MHz).

Figure 10:
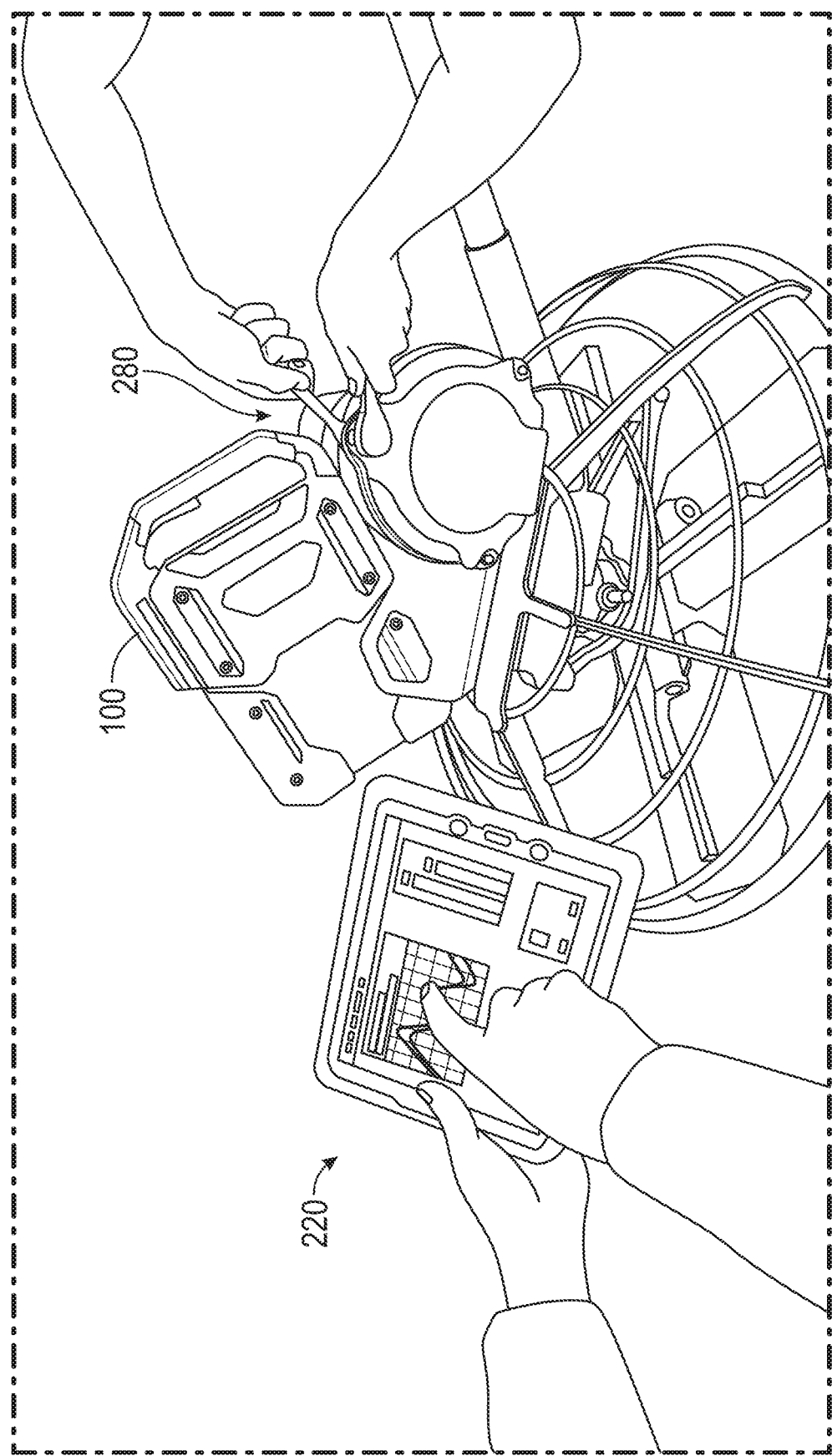
FIG. 10 is a perspective view of the battery system of FIG. 1 in use with a piece of equipment and management software.
Figure 11:
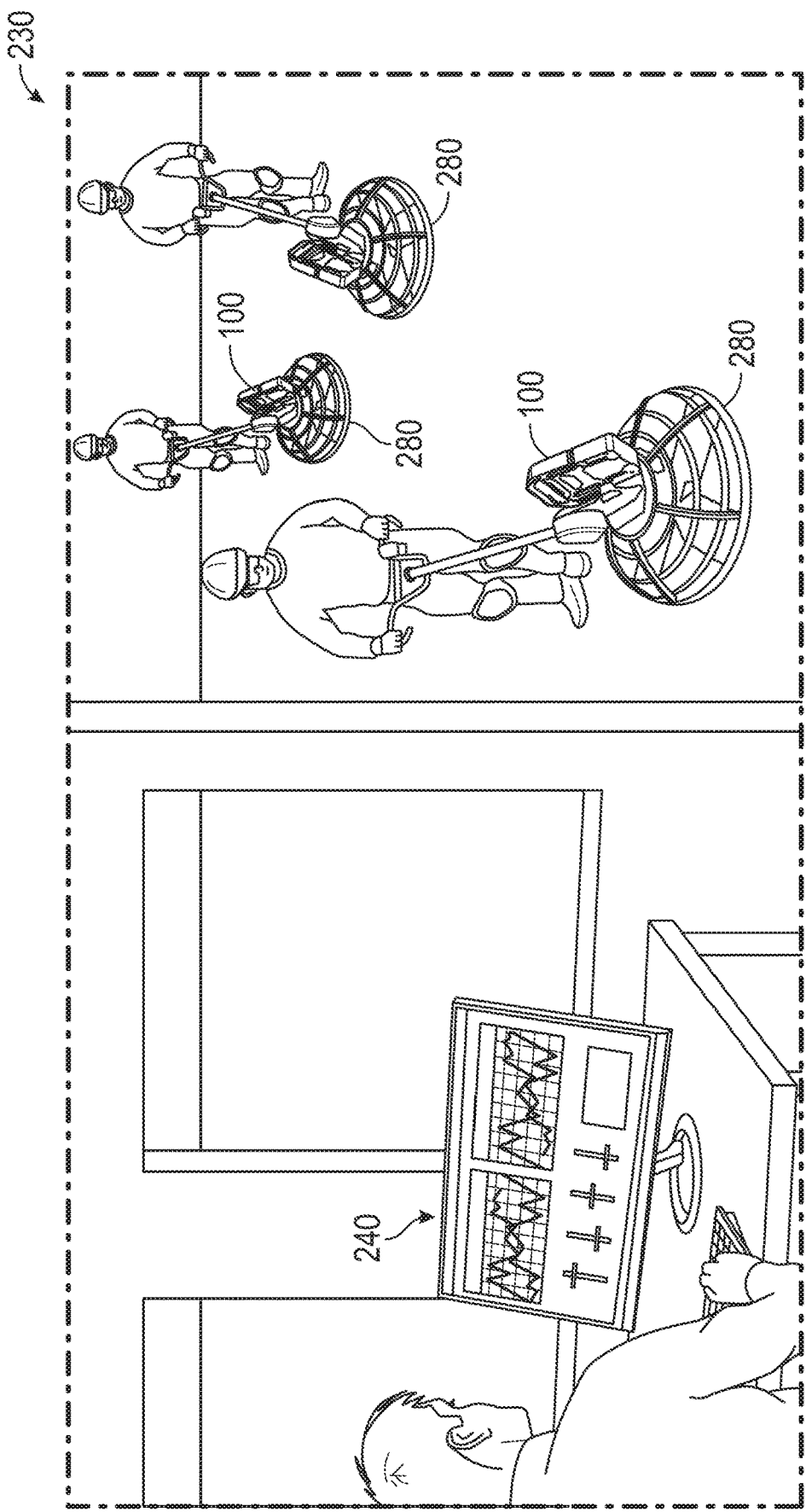
FIG. 11 is a perspective view of the battery system of FIG. 1 in use with a fleet of equipment and management software.

Referring to FIGS. 10 and 11, the battery assembly 100 is shown in use on a piece of power equipment 280 in a design testing environment (e.g., using a development suite). In FIG. 10, the battery assembly 100 is communicably coupled with a mobile device 220 (e.g., a tablet) to provide battery and tool information. In FIG. 11, the battery assembly 100 is communicably coupled with a remote computer system including a dashboard 240 presented on an interface. As the user is operating the equipment 280, information is communicated to the mobile device 220 and dashboard 240 for presentation to a user (e.g., in this scenario, an original equipment manufacturer (OEM)). The performance of the battery assembly 100 and equipment 280 is thus easily communicated to the user such that the user can design, test, track, and improve products based on a continuously monitored system including both the battery assembly 100 and the equipment 280. As such, OEMs can learn how the system operates in quicker fashion such that updates or changes may by made in a more efficient manner. Accordingly, using the system, it may be easier to design electrified products in the long-run since real-time feedback of battery and equipment performance is received.

Referring to FIG. 12, the battery assembly 100 is shown in a mesh network connection environment 300, according to an exemplary embodiment. With the communication gateway 202 shown in FIG. 17 and described above, the battery assembly 100 is capable of coupling to and communicating with other battery assemblies 100, various types of charging systems or stations 304, or other types of gateways/IoT gateways (e.g., gateway 306, vehicle gateway 330), etc. (e.g., via Wi-Fi, Bluetooth, or other data communication systems) over a mesh network. The battery assembly 100 is also configured to couple (e.g., via Near Field Communication or Bluetooth connectivity) to various types of power equipment 302. The battery assembly 100 can also be connected to a network 308. The network 308 allows for connectivity and communication between the battery assembly 100 and various other devices. In some embodiments, operators and/or employees communicate over the network 308 to the battery assembly 100 via personal or mobile endpoint devices 312, such as smartphones, laptop computers, desktop computers, tablet computers, and the like. Accordingly, one or more mobile devices 312 are also connected to the network 308. In some embodiments, a fleet management system 310 is communicably and operatively coupled to the battery assembly 100 via the network 308.

The battery assemblies 100 can communicate with and receive communications through the various devices in the mesh network connection environment 300. For example, battery assemblies 100 can communicate with other battery assemblies 100 to effectively transfer data through the mesh network connection environment 300. In some examples, certain battery assemblies 100 may be designated as primary communicators 100'. While most of the battery assemblies 100 within the mesh network connection environment 300 are configured with NFC tag readers 199 and Bluetooth (or similar) transceivers (e.g., transceiver 214, shown in FIG. 17), certain battery assemblies 100 may be further configured with WiFi transceivers in addition to or in place of NFC tag readers (shown in FIG. 12). Accordingly, other battery assemblies 100 within the mesh network connection environment 300 may communicate with the primary communicator battery assembly 100' via Bluetooth communication. By having a WiFi transceiver, the one or more primary communicator battery assemblies 100' can transmit and receive data from each of the battery assemblies 100 within the mesh network connection environment 300, while also being able to communicate commands or queries from the various other devices connected to the network 308 to each individual battery assembly 100. In some examples, each of the battery assemblies 100 are configured to communicate with other battery assemblies 100 in addition to equipment (e.g., charging stations 304, power equipment 302) and/or gateways 306 and network 308 connected devices.

Figure 13:
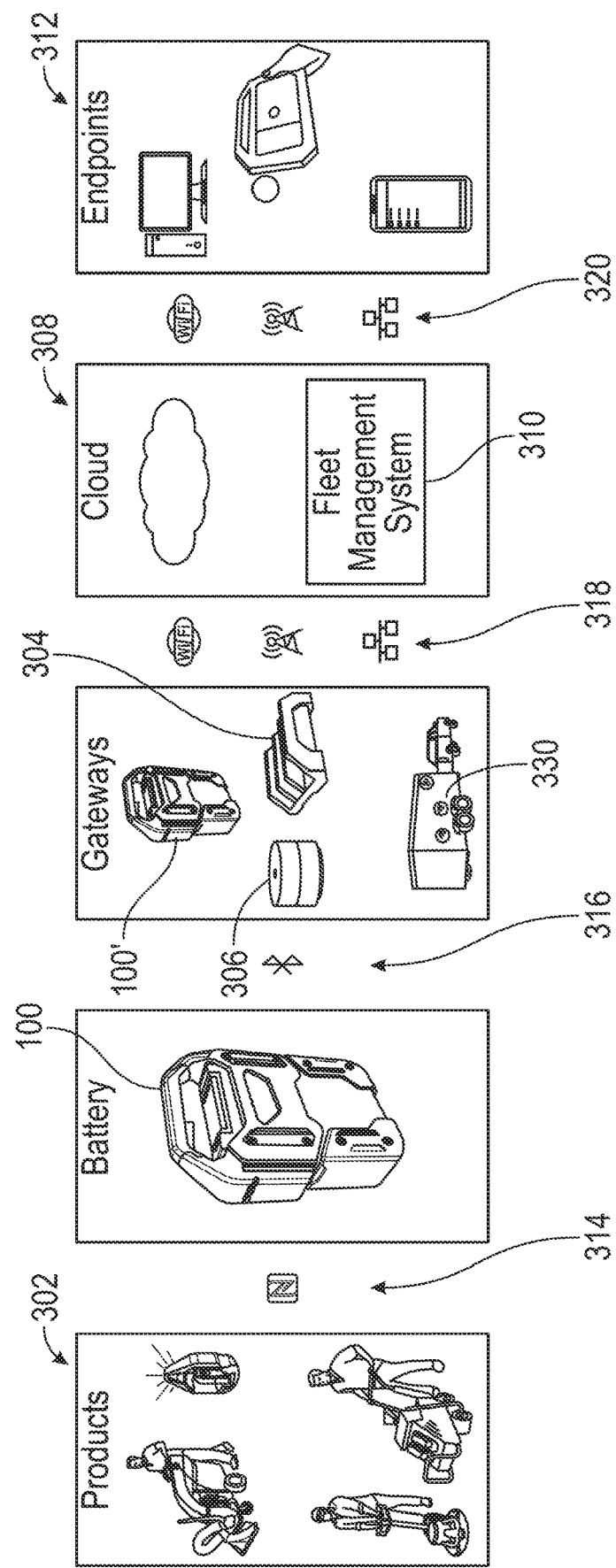
FIG. 13 is a schematic view of a battery management system using Internet of Things (IoT), according to an exemplary embodiment.

Referring to FIG. 13, the battery assembly 100 is shown in an IoT connectivity environment, according to an exemplary embodiment. In some embodiments, the battery assembly 100 does not include cellular communication capabilities (e.g., a base pack) and as such, requires a separate gateway (e.g., a dedicated gateway 306, another battery assembly 100 having cellular communication capabilities, a mobile gateway 330) to communicate via the network 308. In some embodiments, the battery assembly 100 includes cellular communication capabilities and acts as a gateway (e.g., an IoT gateway). As such, data communication between the battery assembly 100 and endpoint devices 312 (e.g., cellular phones, tablets, laptops, computers, etc.) in various combinations may be facilitated by the network 308. In some arrangements, the network 308 includes cellular transceivers. In another arrangement, the network 308 includes the Internet. In yet another arrangement, the network 308 includes a local area network or a wide area network. The network 308 may be facilitated by short and/or long range communication technologies including Bluetooth transceivers, Bluetooth beacons, RFID transceivers, NFC transceivers, Wi-Fi transceivers, cellular transceivers, wired network connections, etc. As such, in one embodiment, the communication between the endpoint devices 312 and the battery assembly 100 can be facilitated by and connected to a cloud-based system via RFID and Wi-Fi connections on the battery assembly 100. In another embodiment, the communication can be facilitated by and connected to a cloud-based system via Wi-Fi only. In another embodiment, the communication can be facilitated by and connected to a cloud-based system via cellular transceivers. In yet another embodiment, the communication can be facilitated by and connected to a cloud-based system via Bluetooth and cellular transceivers. In all such embodiments, the cloud-based system can be made accessible to a third party, such as a consumer and/or rental company.

Figure 14:
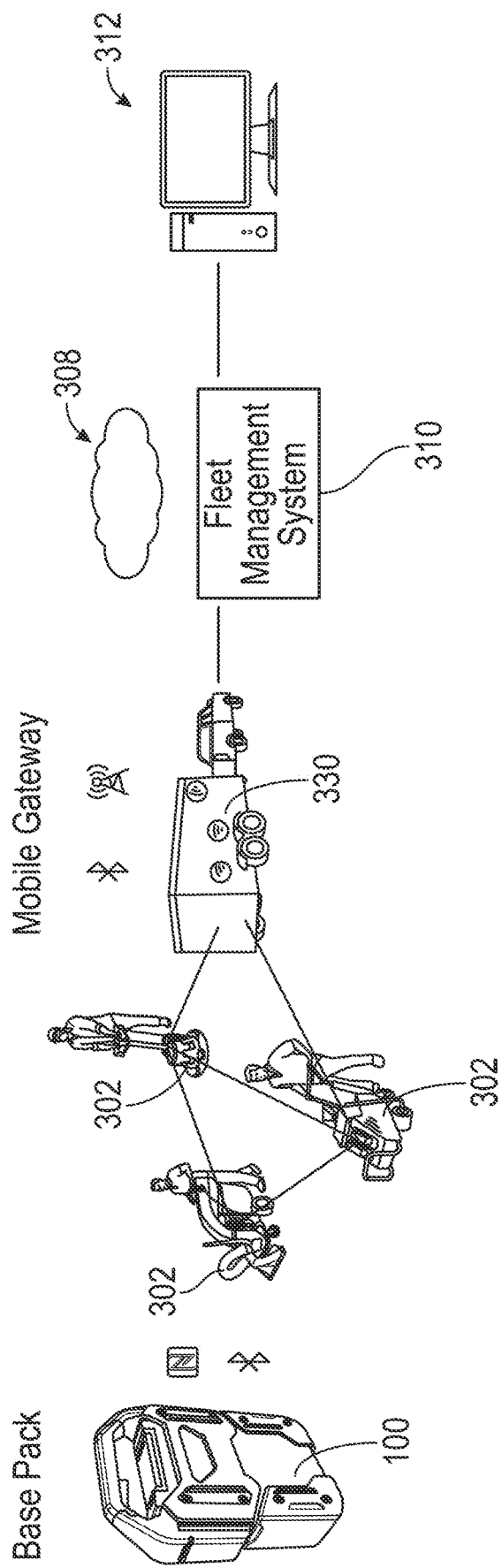
FIG. 14 is a schematic view of a battery management system using IoT and a mobile gateway, according to an exemplary embodiment.

Referring to FIG. 14, the battery assembly 100 is shown in an IoT connectivity environment with a mobile gateway 330. The battery assembly 100 is shown in use with various types of power equipment 302, which the battery assembly 100 is communicably and operatively connected to via NFC or Bluetooth. The battery assembly 100 is also communicably connected to the mobile gateway 330 (e.g., gateway as part of a vehicle, truck, trailer), which provides connection to the network 308 and a fleet management system 310. The endpoint device 312 is also connected to the network 308 to receive communications and battery assembly 100 and equipment 302 information over the network 308. Accordingly, the battery assembly 100 communicates various pieces of information (e.g., status, health, life, number of charges, lapsed rental time, type of equipment, equipment health, equipment status, etc.) through the mobile gateway 330, which communicates the information over the network 308 to the endpoint device 312.

Figure 15:
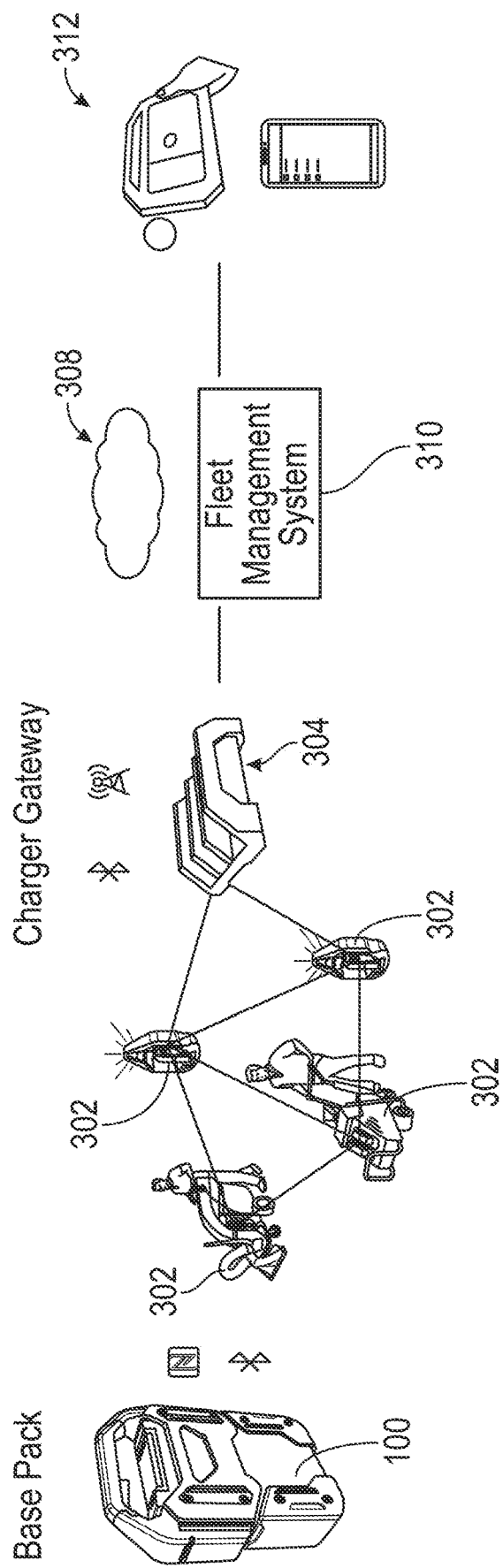
FIG. 15 is a schematic view of a battery management system using IoT and a charger gateway, according to an exemplary embodiment.

Referring to FIG. 15, the battery assembly 100 is shown in an IoT connectivity environment with a charger gateway 304. The battery assembly 100 is shown in use with various types of power equipment 302, which the battery assembly 100 is communicably and operatively connected to via NFC or Bluetooth. The battery assembly 100 is also communicably connected to the charger gateway 304, which provides connection to the network 308 and a fleet management system 310. The endpoint device 312 is also connected to the network 308 to receive communications and battery assembly 100 and equipment 302 information over the network 308. Accordingly, the battery assembly 100 communicates various pieces of information (e.g., status, health, life, number of charges, lapsed rental time, type of equipment, equipment health, equipment status, etc.) through the charger gateway 304, which communicates the information over the network 308 to the endpoint device 312.

Figure 16:
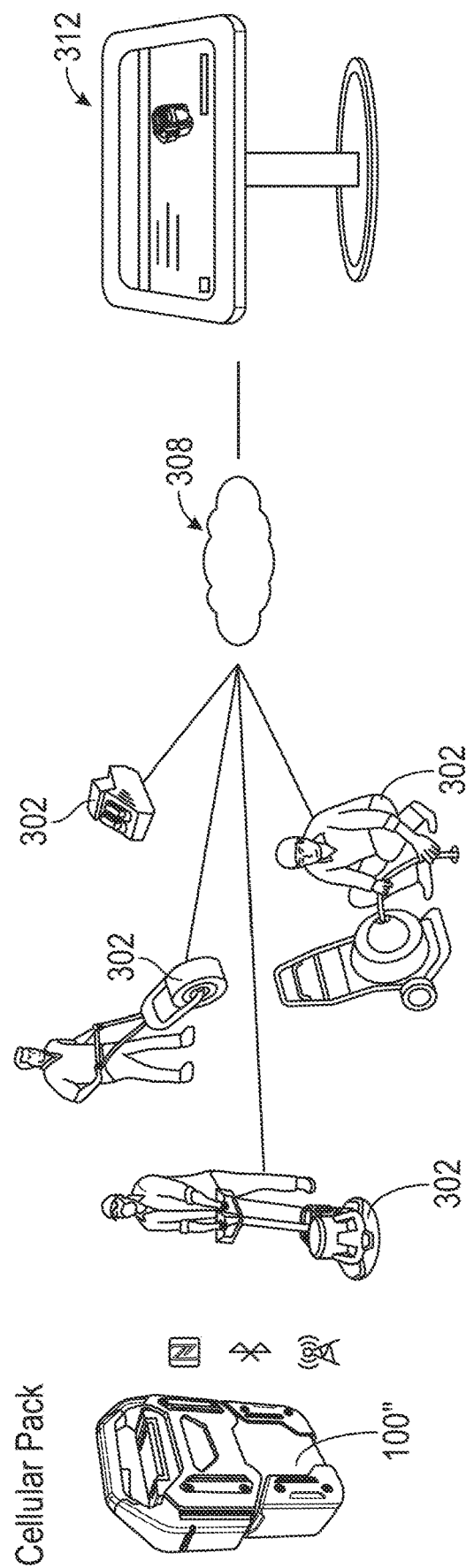
FIG. 16 is a schematic view of a battery management system using IoT and a cellular battery pack, according to an exemplary embodiment.

Referring to FIG. 16, the battery assembly 100" is shown in an IoT connectivity environment with a cellular battery assembly 100". The battery assembly 100" shown in FIG. 16 acts as a gateway such that no separate gateway device is required for the battery assembly 100" to communicate over the network 308. The battery assembly 100" is shown in use with various types of power equipment 302, which the battery assembly 100" is communicably and operatively connected to via NFC and/or Bluetooth. The battery assembly 100" is also communicably connected over the network 308 to an endpoint device 312 (e.g., and to a fleet management system 310). The endpoint device 312 is also connected to the network 308 to receive communications from the battery assembly 100" over the network 308. Accordingly, the battery assembly 100 communicates various pieces of information (e.g., status, health, life, number of charges, lapsed rental time, type of equipment, equipment health, equipment status, etc.) directly to the endpoint device 312 (e.g., without the use of a separate gateway device) over the network 308. The battery assembly 100" can communicate over three different communication protocols (e.g., NFC, Bluetooth, and Wi-Fi) simultaneously using one or more transceivers 214.

The various connectivity environments described herein allow for communication across battery assemblies 100 and across pieces of equipment through integration of the communication capabilities in the battery and not necessarily the equipment itself. Accordingly, the battery assemblies 100 described herein can be used across all platforms, independent of the type of equipment. Additionally, the use of IoT allows for integration of data directly into usage and analytics systems for businesses to better understand how the use of the battery assemblies 100 affect their business and/or how to manage the use of battery assemblies 100 or certain pieces of equipment. In addition, using the battery assembly 100 and various connectivity environments described herein, operation of products, such as light towers, pumps, etc., can be accomplished remotely. In a rental system, the use of IoT allows for disablement and enablement of battery assemblies 100 and/or equipment based on rental time. For example, if a user has used the battery assembly 100 for longer than the allotted rental time, the battery assembly 100 may be shut down (e.g., powered down) remotely. In this way, rental companies save time on tracking the location of and usage of battery assemblies.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a subcombination or variation of a subcombination.

It should be understood that while the use of words such as desirable or suitable utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," or "at least one" are used there is no intention to limit the claim to only one item unless specifically stated to the contrary in the claim.

It should be noted that certain passages of this disclosure can reference terms such as "first" and "second" in connection with side and end, etc., for purposes of identifying or differentiating one from another or from others. These terms are not intended to merely relate entities (e.g., a first side and a second side) temporally or according to a sequence, although in some cases, these entities can include such a relationship. Nor do these terms limit the number of possible entities (e.g., sides or ends) that can operate within a system or environment.

The terms "coupled" and "connected" and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively, or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively, or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

What is claimed is:

1. A battery system comprising:
    a battery assembly including:
        a battery pack comprising a plurality of rechargeable battery cells;
        a battery housing enclosing the battery pack;
        a communication gateway configured to communicate using a first communication protocol and a second communication protocol different from the first communication protocol;
        a first electrical connector including a plurality of first terminals; and
        a management circuit in electrical communication with the battery pack and structured to monitor a status of at least one of the battery pack and a piece of equipment; and
    an equipment interface configured to be coupled to the piece of equipment, the equipment interface including:
        a second electrical connector including a plurality of second terminals, the second electrical connector configured to mate with the first electrical connector and electrically couple the plurality of first terminals and the plurality of second terminals to electrically couple the battery assembly to the equipment interface;
        wherein the first communication protocol is used for communications between the battery assembly and the piece of equipment, wherein the first communication protocol is near-field communication (NFC); and
        wherein the second communication protocol is used for communication between the battery assembly and an endpoint device, wherein the communication gateway of the battery assembly comprises an NFC tag reader structured to wirelessly communicate with the piece of equipment using the first communication protocol, wherein the NFC tag reader is further structured to communicate with the management circuit, and wherein the NFC tag reader is configured to activate and scan for NFC tags within the equipment interface upon receiving an indication from the management circuit that the first electrical connector has been mated with the second electrical connector.

2. The battery system of claim 1, wherein the management circuit is configured to adjust electrical output parameters of the battery assembly upon receiving an indication, from the communication gateway, that an NFC tag has been read by the NFC tag reader.

3. The battery system of claim 2, wherein the electrical output parameters include at least one of voltage and wattage.

4. The battery system of claim 1, wherein the second communication protocol is Bluetooth, and wherein the communication gateway of the battery assembly further comprises a Bluetooth transceiver to communicate with the endpoint device using the second communication protocol.

5. The battery system of claim 1, wherein the communication gateway of the battery assembly further comprises a transceiver configured to communicate over frequencies between 2.3 GHz and 2.5 GHz.

6. The battery system of claim 1, wherein the management circuit is configured to not supply electricity from the battery assembly to the equipment interface upon receiving an indication of a health status of the piece of equipment when the first electrical connector has been mated with the second electrical connector.

7. A battery system comprising:
    a battery assembly including:
        a battery pack having a capacity of at least 300 Watt-hours;
        a battery housing substantially enclosing the battery pack;
        a first electrical connector including a plurality of first terminals in communication with the battery pack;
        a near-field communication (NFC) tag reader; and
        a management circuit in communication with the NFC tag reader and structured to adjust an electrical output parameter of the battery pack; and
    an equipment interface configured to be coupled to a piece of equipment, the equipment interface including:
        a second electrical connector including a plurality of second terminals, the second electrical connector configured to mate with the first electrical connector and electrically couple the first terminals and second terminals to electrically couple the battery assembly to the equipment interface; and
        an NFC tag received within the equipment interface;
    wherein the NFC tag reader is structured to read information from the NFC tag on the equipment interface and communicate the read information from the NFC tag to the management circuit, wherein the management circuit adjusts the electrical output parameter of the battery pack based upon the read information from the NFC tag.

8. The battery system of claim 7, wherein the plurality of first terminals and the plurality of second terminals include data pins, and wherein when the first electrical connector is mated with the second electrical connector, the management circuit is structured to monitor a status of at least one of the battery pack and the piece of equipment using information received over the data pins.

9. The battery system of claim 7, wherein the electrical output parameter of the battery includes at least one of a wattage, an amperage, and an output voltage of the battery.

10. The battery system of claim 9, wherein the management circuit can adjust the output voltage of the battery over a range of between about 0 V and about 48 V.

11. The battery system of claim 7, wherein the battery assembly further comprises a transceiver configured to communicate over a frequency between 2.3 GHZ and 2.5 GHz, the transceiver being in communication with the management circuit and configured to transmit operational data from each of the battery and the piece of equipment to an endpoint device.

12. A battery assembly comprising:
a battery housing;
a battery pack including plurality of rechargeable battery cells disposed within the battery housing;
an electrical connector including a plurality of terminals structured to selectively connect the battery assembly to an equipment interface mounted on a piece of power equipment, the plurality of terminals including power terminals and at least one data terminal separate from the power terminals;
a management circuit structured to monitor and control a battery status of the battery assembly, the management circuit configured to adjust at least one electrical output parameter of electricity supplied from the battery pack to the electrical connector; and
a communication gateway having at least one transceiver in communication with the management circuit, the communication gateway being configured to communicate over at least two different frequencies, wherein a first frequency is between about 13 MHz and 14 MHz and a second frequency is between about 2.3 GHz and 2.5 GHz.

13. The battery assembly of claim 12, wherein the management circuit is configured to adjust a wattage of electricity supplied from the battery pack to the electrical connector.

14. The battery assembly of claim 13, wherein the management circuit is in communication with a memory storing a plurality of operational parameters for different pieces of power equipment, and wherein the management circuit is configured to adjust a wattage of the electricity supplied from the battery pack to the electrical connector to match the stored operational parameters of a piece of power equipment that is coupled with the battery assembly.

15. The battery assembly of claim 14, wherein the communication gateway includes an NFC tag reader communicating over the first frequency, the NFC tag reader being configured to communicate an identity of the piece of power equipment that is coupled with the battery assembly.

16. The battery assembly of claim 13, wherein the communication gateway is configured to communicate at least a battery status indication over a network to an endpoint device using the second frequency.

17. The battery assembly of claim 13, wherein the communication gateway is configured to communicate with a second battery assembly over the second frequency, the second battery assembly including a second transceiver configured to communicate over a third frequency different than the first frequency and different than the second frequency, the second transceiver being in communication with a wireless network using the third frequency.

\* \* \* \* \*